(12) United States Patent
Tagawa

(10) Patent No.: US 12,293,243 B2
(45) Date of Patent: May 6, 2025

(54) INFORMATION PROCESSING APPARATUS ADDITIONAL DRAWING PROCESSING IN FRONT OF DRAWING CONTENT ISSUED BY AN APPLICATION

(71) Applicant: CANON KABUSHIKI KAISHA, Tokyo (JP)

(72) Inventor: Reo Tagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/347,052

(22) Filed: Jul. 5, 2023

(65) Prior Publication Data
US 2024/0127019 A1  Apr. 18, 2024

(30) Foreign Application Priority Data
Jul. 6, 2022  (JP) .................................. 2022-109238

(51) Int. Cl.
*G06K 15/00* (2006.01)
*G06K 15/02* (2006.01)

(52) U.S. Cl.
CPC ..... *G06K 15/1852* (2013.01); *G06K 15/1865* (2013.01); *G06K 15/1881* (2013.01)

(58) Field of Classification Search
None
See application file for complete search history.

(56) References Cited

U.S. PATENT DOCUMENTS

| 5,999,710 A   | * | 12/1999 | Smith     | G06K 15/1865 |
|               |   |         |           | 358/1.15     |
| 7,085,020 B2  | * | 8/2006  | Trelewicz | H04N 1/413   |
|               |   |         |           | 375/E7.209   |
| 2002/0018233 A1 | * | 2/2002 | Mori      | G03G 15/5087 |
|               |   |         |           | 358/1.15     |
| 2003/0016235 A1 | * | 1/2003 | Odagawa   | G06T 11/60   |
|               |   |         |           | 345/629      |
| 2003/0202213 A1 | * | 10/2003 | Saito    | H04N 1/32144 |
|               |   |         |           | 358/1.18     |
| 2006/0221371 A1 | * | 10/2006 | Ogasawara | G06K 15/02  |
|               |   |         |           | 358/448      |

FOREIGN PATENT DOCUMENTS

| JP | H11298717 A    |   | 10/1999 |
| JP | 2010213209 A   | * | 9/2010  |
| JP | 2012146240 A   | * | 8/2012  |

* cited by examiner

*Primary Examiner* — Barbara D Reinier
(74) *Attorney, Agent, or Firm* — Canon U.S.A., Inc. IP Division

(57) ABSTRACT

In a host computer, a print processor generates, in a drawing region of a memory device context, additional raster data for drawing an additional drawing in addition to drawing information regarding a logical page included in an Enhanced Metafile Format (EMF) spool file, and a graphics driver (GD) module of a printer driver combines document raster data generated in a drawing region of a printer device context with the additional raster data, and generates print data based on post-combination raster data.

17 Claims, 36 Drawing Sheets

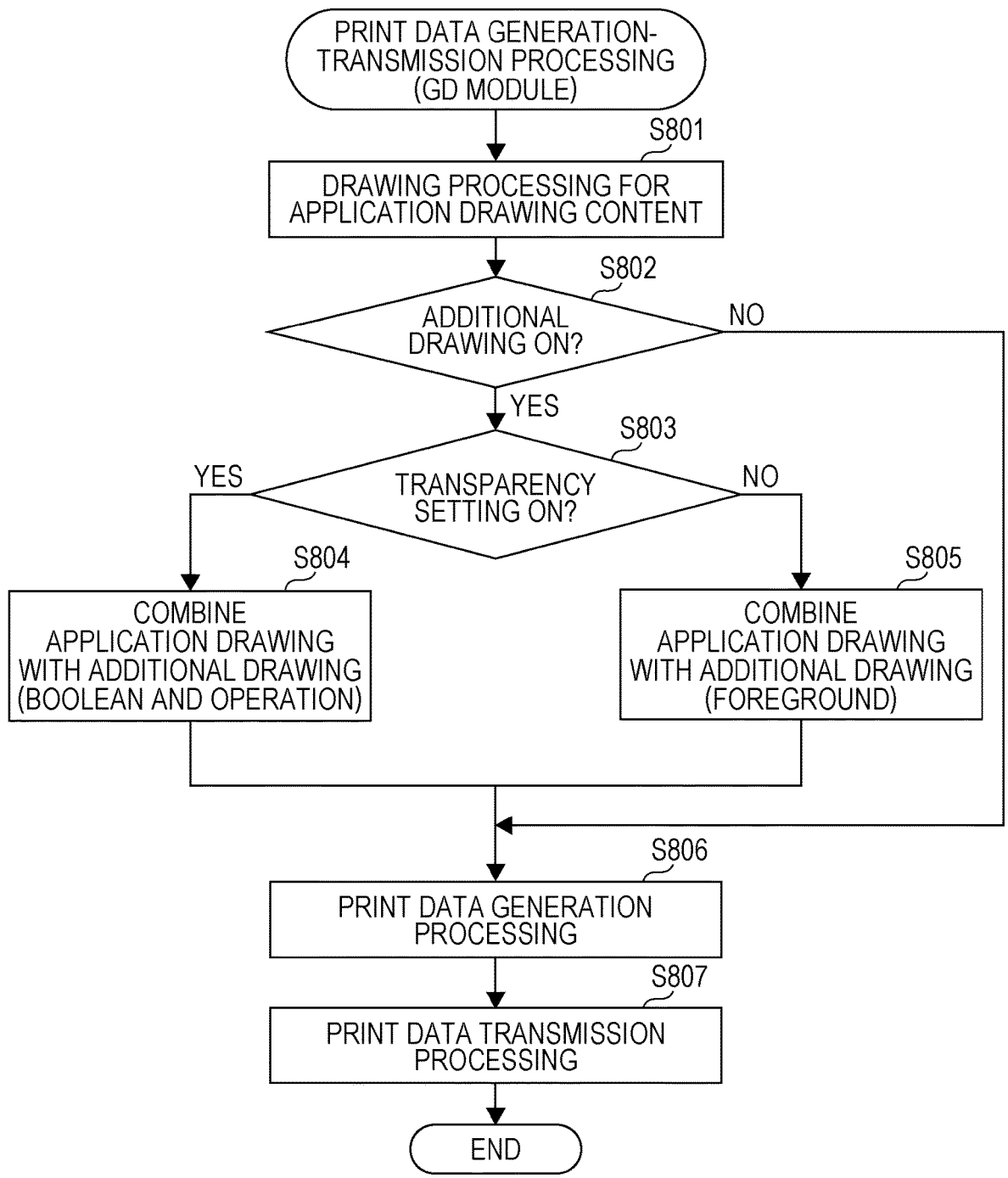

FIG. 10A

ABCDEFGHIJ  ABCDEFGHIJ
1234567890  1234567890

ABCDEFGHIJ  ABCDEFGHIJ
1234567890  1234567890

ABCDEFGHIJ  ABCDEFGHIJ
1234567890  1234567890

FIG. 10B

ABCDEFGHIJ  ABCDEFGHIJ
1234567890  1234567890

ABCDEFGHIJ  ABCDEFGHIJ
1234567890  1234567890

ABCDEFGHIJ  ABCDEFGHIJ
1234567890  1234567890

FIG. 10C

ABCDEFGHIJ  ABCDEFGHIJ
1234567890  1234567890

ABCDEFGHIJ  ABCDEFGHIJ
1234567890  1234567890

ABCDEFGHIJ  ABCDEFGHIJ
1234567890  1234567890

FIG. 11A

ABCDEFGHIJ
1234567890

ABCDEFGHIJ
1234567890

ABCDEFGHIJ
1234567890

ABCDEFGHIJ1234567890
ABCDEFGHIJ1234567890
ABCDEFGHIJ1234567890

FIG. 11B

ABCDEFGHIJ
1234567890

ABCDEFGHIJ
1234567890

ABCDEFGHIJ
1234567890

ABCDEFGHIJ1234567890
ABCDEFGHIJ1234567890
ABCDEFGHIJ1234567890

SAMPLE

FIG. 11C

ABCDEFGHIJ
1234567890

ABCDEFGHIJ
1234567890

ABCDEFGHIJ
1234567890

ABCDEFGHIJ1234567890
ABCDEFGHIJ1234567890
ABCDEFGHIJ1234567890

SAMPLE

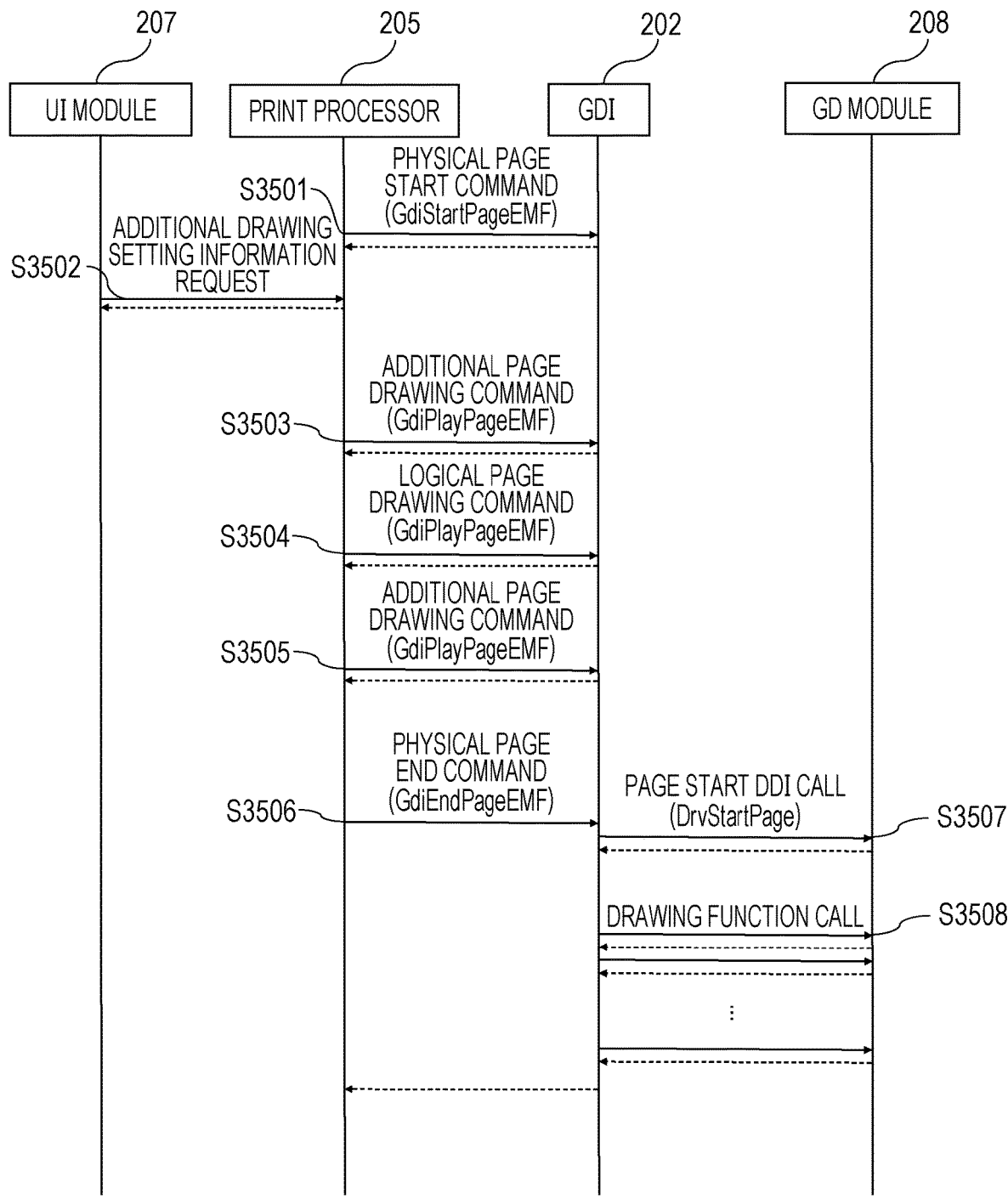

INFORMATION PROCESSING APPARATUS ADDITIONAL DRAWING PROCESSING IN FRONT OF DRAWING CONTENT ISSUED BY AN APPLICATION

BACKGROUND

Field of the Disclosure

The present disclosure relates to print data generation. In particular, the present disclosure generally relates to print data generation in which an additional drawing is drawn in addition to drawing content issued by an application.

Description of the Related Art

In a case where printing is performed from an application program (hereinafter referred to as an "application"), an additional drawing function is known through which additional text or images are drawn in addition to drawing content issued by the application.

Examples of information to be drawn through the additional drawing function include a stamp, a watermark, page numbers, a username, an organization name, a document name, a personal computer (PC) name, a date, a time, and a character or a mark for indicating a binding margin or a glue margin.

This additional drawing function is used for various purposes such as improvement of browsing, improvement of convenience of document management, achievement of secure printing, and so forth.

In Japanese Patent Laid-Open No. 11-298717, a technology is disclosed in which a printer driver supplies, to a print unit, bitmap data of a ground pattern to be printed on a sheet in advance and bitmap data of any image to be printed on the ground pattern such that the ground pattern and the image overlap. According to this, printing can be performed such that a ground pattern is added under any image that the user intends to print.

As described above, using the technology described in Japanese Patent Laid-Open No. 11-298717, any image to which a ground pattern is added can be printed. However, using the technology described in Japanese Patent Laid-Open No. 11-298717, additional drawing processing may not be performed in front of an image.

SUMMARY

The present disclosure provides a system that enables print data for performing additional drawing processing in front of drawing content issued by an application to be more appropriately generated.

The present disclosure provides an information processing apparatus including a print processor and a printer driver. The information processing apparatus is configured to generate print data using the print processor and the printer driver. The print processor is configured to calculate allocation of a logical page to a physical page, the logical page being included in a spool file that stores drawing information regarding one or more logical pages generated by an application. The printer driver is configured to generate, using a result of the calculation, first raster data based on drawing information regarding the one or more logical pages in a drawing region for printing. The print processor includes an additional drawing unit configured to generate, in a drawing region different from the drawing region for printing, second raster data for drawing an additional drawing in addition to the drawing information regarding the one or more logical pages. The printer driver includes a combining unit configured to combine the first raster data with the second raster data to generate third raster data. The printer driver includes a generation unit configured to generate print data based on the third raster data.

Further features of the present disclosure will become apparent from the following description of embodiments with reference to the attached drawings.

BRIEF DESCRIPTION OF THE DRAWINGS

FIG. 8 is a flow chart illustrating print data generation-transmission processing according to the first embodiment.

FIGS. 10A to 10C include diagrams schematically illustrating examples of post-combination raster data according to the first embodiment.

FIGS. 11A to 11C include diagrams schematically illustrating examples of post-combination raster data according to the first embodiment.

FIG. 35 is a sequence diagram illustrating operations in page drawing processing according to the ninth embodiment at the time of performing additional drawing processing.

DESCRIPTION OF THE EMBODIMENTS

In the following, embodiments will be described in detail with reference to the drawings. Note that the following embodiments are not intended to limit the present disclosure according to the Claims. All combinations of a plurality of characteristics described in the embodiments are not always necessary to solutions provided by the present disclosure.

First Embodiment

Figure 1:
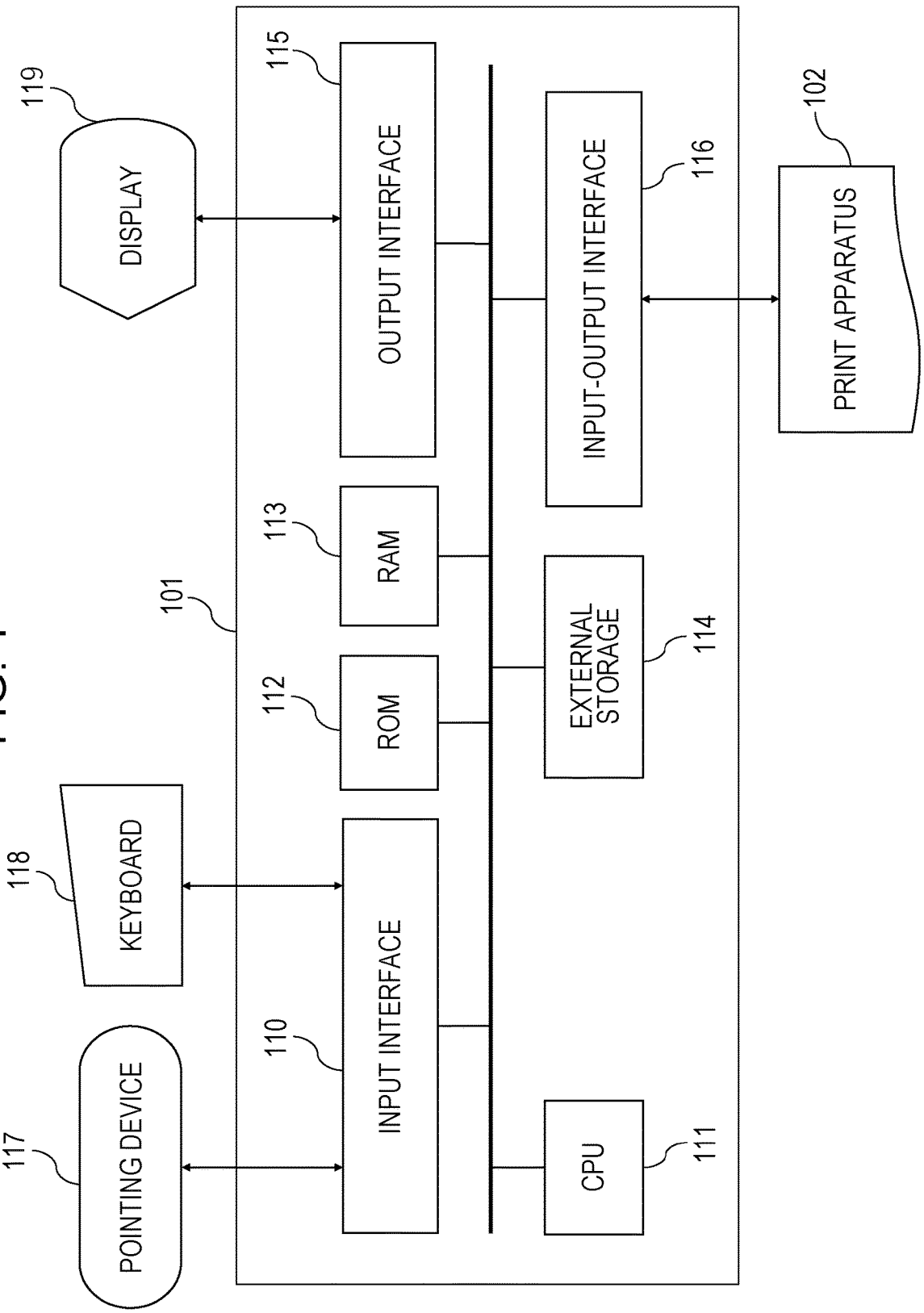
FIG. 1 is a block diagram illustrating a hardware configuration of a print system illustrating the present embodiment.

FIG. 1 is a block diagram illustrating an example of a hardware configuration of a print system illustrating an embodiment of the present disclosure.

In FIG. 1, a host computer 101 is an example of an information processing apparatus. The host computer 101 includes an input interface 110, a central processing unit (CPU) 111, a read-only memory (ROM) 112, a random access memory (RAM) 113, an external storage 114, an output interface 115, and an input-output interface 116.

An input device such as a keyboard 118 or a pointing device 117 is connected to the input interface 110. A display device such as a display 119 is connected to the output interface 115.

An initialization program is stored in the ROM 112. A group of application programs, an operating system (OS), and other various types of data are stored in the external storage 114. The RAM 113 is used as, for example, a work memory for a case where various types of program stored in the external storage 114 are executed. In the present embodiment, functions of the host computer 101, which will be described later, and processing according to flowcharts to be described later are realized by the CPU 111 performing processing in accordance with the procedures of programs stored in the ROM 112.

A print apparatus 102, which is a device, is connected to the host computer 101 with the input-output interface 116 interposed therebetween. In this case, the host computer 101 and the print apparatus 102 are configured in a separate manner; however, the host computer 101 and the print apparatus 102 may be configured as a single information processing apparatus. The input-output interface 116 may be an interface such as a Universal Serial Bus (USB) or a network interface.

Figure 2:
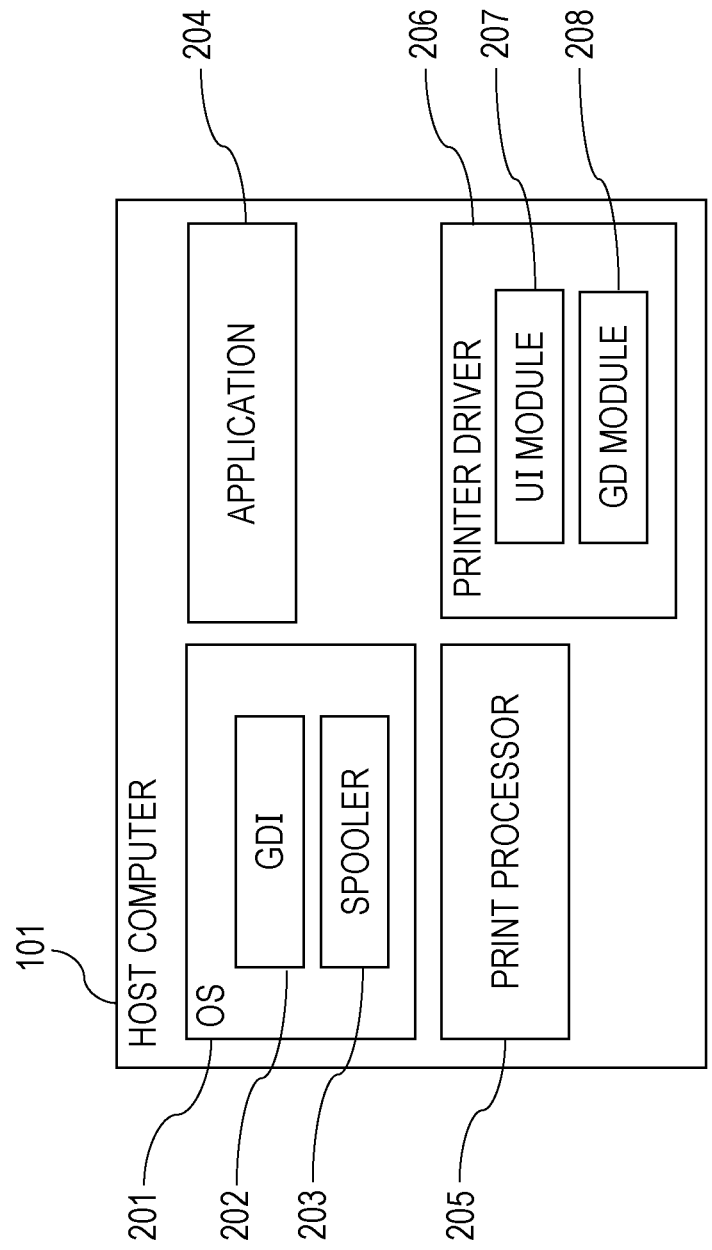
FIG. 2 is a diagram illustrating a software configuration of a host computer according to the present embodiment.

FIG. 2 is a diagram illustrating an example of a software configuration of the host computer 101 according to the present embodiment.

The host computer 101 has the following components and software programs. Functions realized through these software programs are realized by the CPU 111 of the host computer 101 executing programs stored in the ROM 112.

An OS 201 is an operating system that performs basic control on the host computer 101. The OS 201 has a Graphics Device Interface (GDI) 202 and a spooler 203.

The GDI 202 provides an application programming interface (API) for performing drawing processing.

The spooler 203 is a component that performs generation processing for an Enhanced Metafile Format (EMF) spool file 301 (FIG. 3), which will be described later. In the present embodiment, Windows Spooler is used as the spooler 203; however, the spooler 203 is not limited to this.

An application 204 is a software program for setting print settings for documents, images, and so forth and issuing a print command upon reception of a command from the user.

A print processor 205 is a component for issuing, to a printer driver 206, a command for setting, for example, output coordinates, an output direction, or an output order for printing using the GDI 202.

The printer driver 206 has a user interface (UI) module 207 and a graphics driver (GD) module 208.

The UI module 207 is a module for providing an interface through which the user inputs print settings, and for informing the print processor 205 and the GD module 208 of the print settings.

The GD module 208 is a module for realizing a function for drawing processing for printing and a function for generating print data inside a drawing memory 304, which will be described later, of FIG. 3.

As processing for printing an additional drawing, instead of an application, there is a method for drawing an additional drawing using a notification of a print event issued by a system, and inserting the additional drawing between pages of a document for the application. However, in a case where printing is performed in the splwow64 process on Windows®, such a method cannot be used due to constraints caused by the OS. Note that the splwow64 process is a process executed when, for example, a print setting screen is opened or printing is executed from a 32-bit application on a 64-bit Windows®. The conditions under which the splwow64 process is executed are examples and are not limited to those conditions. A process other than the splwow64 process is, for example, an application process.

Thus, the present disclosure provides a system that can perform additional drawing processing in front of drawing content issued by an application, that is less likely to be constrained by the OS, and that can generate print data with which a correct number of pages can be reported to the OS.

Figure 3:
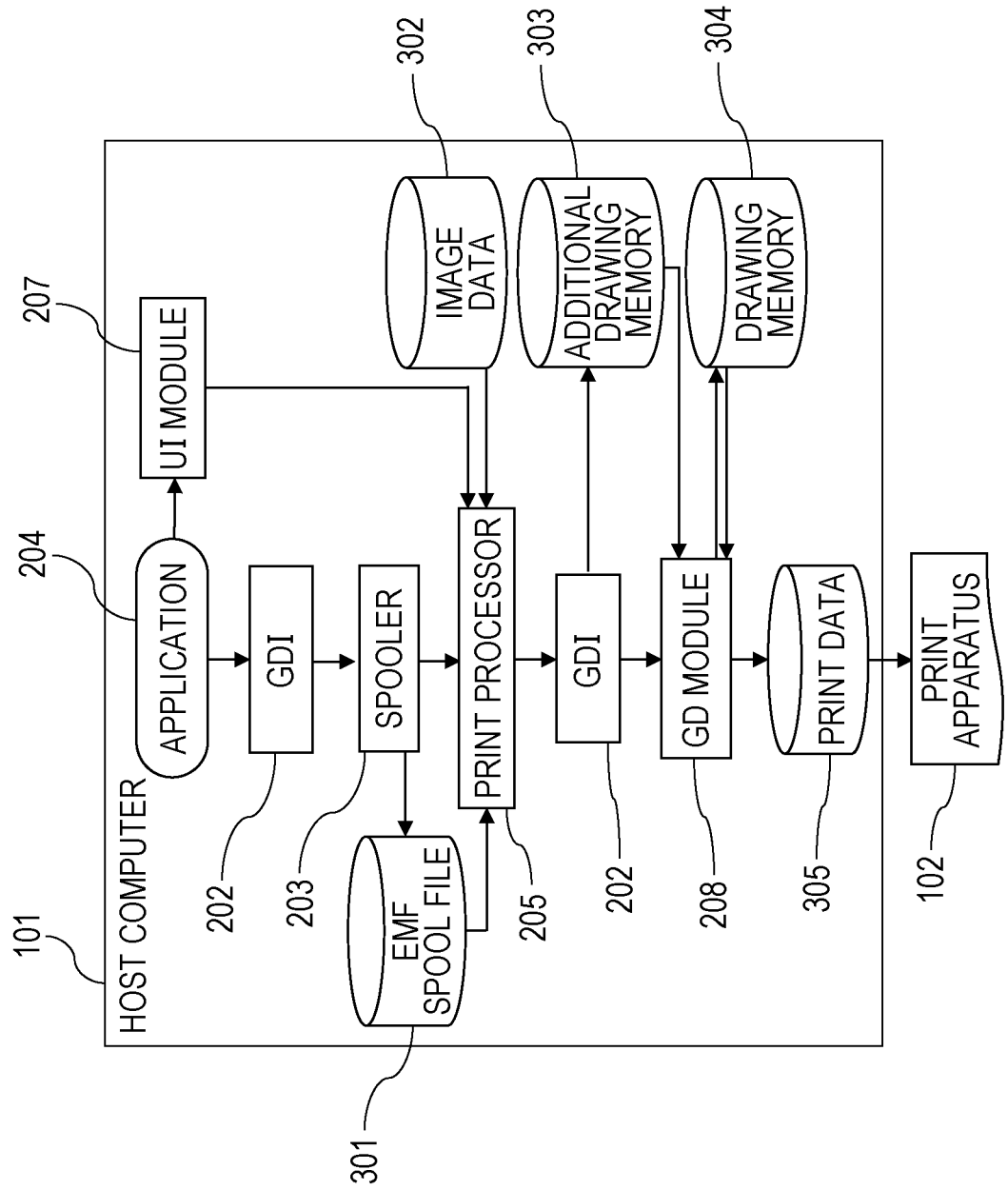
FIG. 3 is a diagram illustrating data flow from when a print command is issued by an application to when print data is transmitted to a print apparatus.

FIG. 3 is a diagram illustrating an example of data flow from when a print command is issued by the application 204 to when print data is transmitted to the print apparatus 102.

The application 204 calls the UI module 207 as needed to generate print settings. In order to generate print settings, the UI module 207 displays a print setting screen on the display 119. The user may input, using the pointing device 117 or the keyboard 118, setting information necessary for performing additional drawing processing (hereinafter referred to as "additional drawing setting information").

When the user causes the application 204 to issue a print command, the application 204 passes the print settings and drawing data to the GDI 202.

Upon receiving the print settings and drawing data from the application 204, the GDI 202 stores, in an EMF spool file 301, the print settings and information (drawing information) regarding a drawing command via the spooler 203. The EMF is a Windows standard format for storing drawing data. The EMF spool file 301 has one or more spool pages. For example, in a case where the application 204 issues a command for printing a document file having a plurality of pages, a EMF spool file 301 that has a plurality of spool pages can be generated.

Once the print settings and drawing information have been stored in the EMF spool file 301, the spooler 203 loads the print processor 205.

The print processor 205 acquires additional drawing setting information from the UI module 207 for performing additional drawing processing (additional drawing processing for adding information to drawing information for a spool page). In this case, when an image is to be drawn as an additional drawing, the print processor 205 loads image data 302 stored on the host computer 101. The image data 302 is generated, for example, as an image file on the host computer 101, and can be loaded by the print processor 205.

Note that the image data 302 may be prestored as internal data of the print processor 205 or the printer driver 206. In such a case, when printing is performed using Point and Print, which is a function of Windows, the following effect can be obtained. Note that Point and Print is a function that enables a client to download the print processor 205 and the printer driver 206 from a print server and issue a print command to the print server. In Point and Print, one of two settings can be set. The two settings are a setting in which the print processor 205 or the GD module 208 performs processing associated with printing on the client side and a setting in which the print processor 205 or the GD module 208 performs processing associated with printing on the server side. When a configuration is used in which the image data 302 is retained as internal data of the print processor 205 or the printer driver 206, the print processor 205 can load the image data 302 in either of the settings described above, so that an image can be drawn as an additional drawing.

Thereafter, the print processor 205 determines drawing content of the additional drawing on the basis of the above-described additional drawing setting information. Next, the print processor 205 performs additional drawing processing on an additional drawing memory 303 by calling an application programming interface (API) function of the GDI 202, and passes information in the additional drawing memory 303 to the GD module 208.

Furthermore, the print processor 205 issues, by calling an API function of the GDI 202, a command for causing the GD module 208 to draw a spool page included in the EMF spool file 301.

The GD module 208 performs drawing on the drawing memory 304 on the basis of the drawing command received from the GDI 202 (what is drawn here is the drawing content issued by the application 204).

Next, the GD module 208 combines, in the drawing memory 304, the drawing in the drawing memory 304 with the drawing included in the additional drawing memory 303 and received from the print processor 205 via the GDI 202.

Thereafter, the GD module 208 generates, on the basis of the combined drawing result in the drawing memory 304, print data 305 that the print apparatus 102 can read, and transmits the print data 305 to the print apparatus 102.

Figure 4:
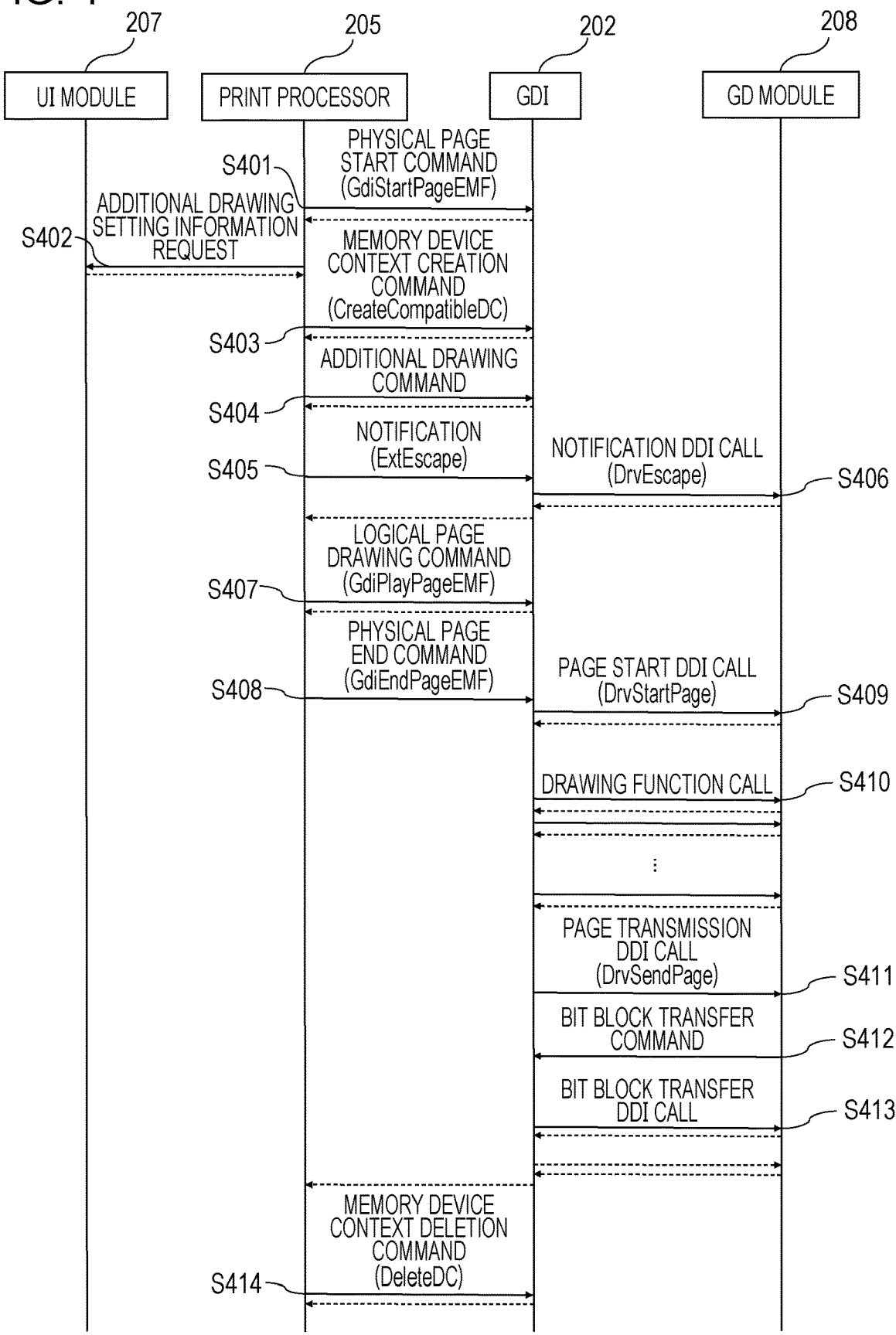
FIG. 4 is a sequence diagram illustrating operations in page drawing processing at the time of performing additional drawing processing.

FIG. 4 is a sequence diagram illustrating an example of operations in page drawing processing performed by the UI module 207, the print processor 205, the GDI 202, and the GD module 208 at the time of performing additional drawing processing.

First, in S401, the print processor 205 issues a physical page start command (GdiStartPageEMF) to the GDI 202.

In S402, the print processor 205 requests additional drawing setting information from the UI module 207 and acquires the additional drawing setting information. The additional drawing setting information is information necessary to determine content of an additional drawing. Examples of the additional drawing setting information include a character string such as "confidential" or "private", text color, text decoration, coordinates for drawing, a rotation angle at the time of drawing, a drawing size, the type of enclosing box, and ON-OFF of transparency but are not limited thereto.

In S403, the print processor 205 issues a memory device context creation command (CreateCompatibleDC) to the GDI 202.

In the following, a device context will be described.

A device context is a data structure obtained by abstracting a drawing destination device such as a printer, a display, or a memory. A device context includes setting information necessary for drawing such as setting information regarding a brush or information regarding a drawing region. In the API of the GDI 202, a drawing command can be issued to a desired drawing destination device by specifying the handle of a device context.

In printing, a "printer device context" for printing is used, and drawing content at the time of printing is instructed by specifying "the handle of the printer device context" in the API of the GDI 202.

Likewise, a drawing command can be issued for a drawing region on a memory associated with a "memory device context" by specifying the handle of the "memory device context" in the API of the GDI 202.

In S404, the print processor 205 issues an additional drawing command to the GDI 202. In this case, the handle of the "memory device context" created in S403 described above is specified to call an API function of the GDI 202, so that desired additional drawing processing is to be performed. As a result, additional drawing processing is performed on the drawing region of the "memory device context" (a region corresponding to the additional drawing memory 303 in FIG. 3).

In S405, the print processor 205 calls a notification API (ExtEscape) of the GDI 202 in order to notify the GD module 208 of information necessary to synthesize the additional drawing. Examples of the information include the handle of the printer device context and the handle of the memory device context.

In S406, the GDI 202 issues a notification Device Drivers Interface (DDI) call (DrvEscape) to the GD module 208. As a result, the GD module 208 is notified of information necessary to synthesize the additional drawing. DDI is a function interface for calling processing for the printer driver 206 from the GDI 202.

In S407, the print processor 205 issues a logical page drawing command (GdiPlayPageEMF) to the GDI 202. As a result, the GDI 202 is commanded to draw a specific spool page included in the EMF spool file 301. Note that, at this point in time, drawing is not performed on the drawing region of the "printer device context" (the region corresponding to the drawing memory 304 in FIG. 3). Note that in a case where a plurality of logical pages are allocated to one physical page, S407 described above is performed a plurality of times.

In S408, the print processor 205 issues a physical page end command (GdiEndPageEMF) to the GDI 202.

In S409, the GDI 202 issues a page start DDI call (DrvStartPage) to the GD module 208.

In S410, the GDI 202 issues a drawing function call to the GD module 208.

As a result, in the GD module 208, the drawing content issued by the application 204 is drawn on the drawing region of the "printer device context" (the region corresponding to the drawing memory 304 in FIG. 3).

In S411, the GDI 202 issues a page transmission DDI call (DrvSendPage) to the GD module 208.

In S412, the GD module 208 issues a bit block transfer command to the GDI 202 during processing of the page transmission DDI. By the bit block transfer command, transfer of the drawing region of "memory device context" (the region corresponding to the additional drawing memory 303) to the drawing region of the "printer device context" (the region corresponding to the drawing memory 304) is commanded. For this command, for example, an API function such as BitBlt, TransparentBlt, StretchBlt, or AlphaBlend can be used.

In S413, the GDI 202 issues a bit block transfer DDI call to the GD module 208. In this case, the GDI 202 issues a DDI call corresponding to the API function used in S412. Through the processing, the content in the drawing region of the "memory device context" is transferred to the drawing region of the "printer device context", thereby entering a state where the additional drawing content is added to the drawing region of the "printer device context".

In S414, the print processor 205 issues a memory device context deletion command (DeleteDC).

In the above, the sequence diagram illustrating an example of the operations in page drawing processing performed at the time of performing additional drawing processing has been described.

By performing such operations, additional drawing processing can be performed in front of the drawing content issued by the application 204.

Note that if the print processor 205 uses the API of the GDI 202 to directly specify the "printer device context" and performs additional drawing processing, a phenomenon occurs in which additional drawing processing is performed behind the drawing content issued by the application 204. In the following, this phenomenon will be described.

Normally, the GDI 202 issues a drawing function call to the GD module 208 after the physical page end command (GdiEndPageEMF) is issued, and the drawing content issued by the application 204 is drawn on the drawing region of the "printer device context" (the region corresponding to the drawing memory 304).

Thus, in a case where the print processor 205 calls the API of the GDI 202 to perform additional drawing processing before the physical page end command (GdiEndPageEMF) is issued, additional drawing processing is performed before the drawing content issued by the application 204 is drawn. Thus, additional drawing processing is performed behind the drawing content issued by the application 204.

In contrast, in a case where the print processor 205 calls the API of the GDI 202 to perform additional drawing processing after the physical page end command (GdiEndPageEMF) is issued, the GD module 208 has already completed processing for a target physical page. Thus, additional drawing processing is performed in the background of the page subsequent to the target physical page. Consequently, additional drawing processing cannot be performed in the foreground of the target physical page also in this case.

In the present embodiment, additional drawing processing is performed on the drawing region of the "memory device context" (the region corresponding to the additional drawing memory 303). After the GD module 208 has issued the drawing function call, and the drawing content issued by the application 204 is drawn on the drawing region of the "printer device context" (the region corresponding to the drawing memory 304), a method is used in which a command to combine the drawing region of the "memory device context" with the drawing region of the "printer device context" is issued. As a result, additional drawing processing can be performed in the foreground of the target physical page.

Figure 5:
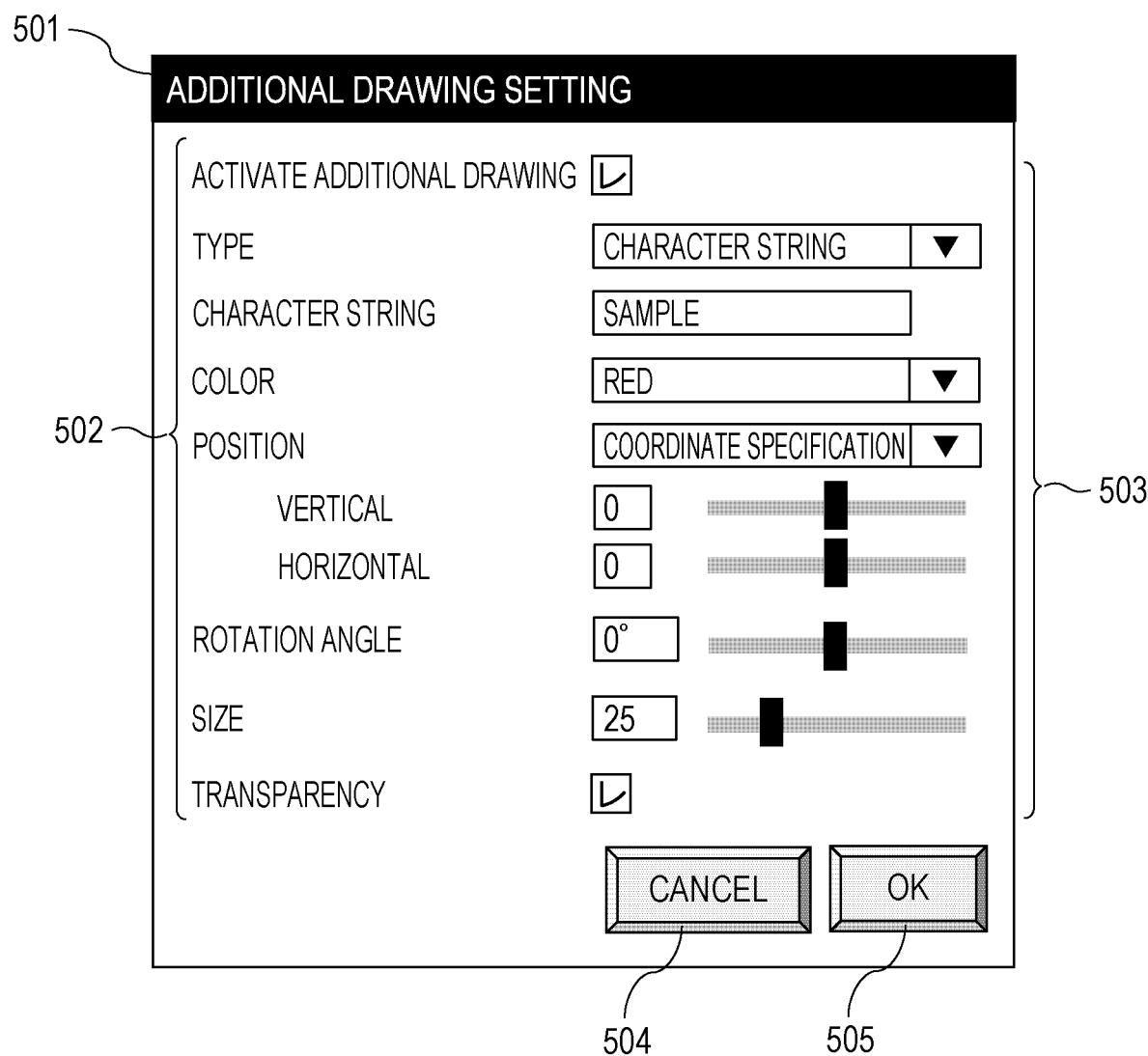
FIG. 5 is a diagram illustrating an additional drawing setting screen according to a first embodiment.

FIG. 5 is a diagram illustrating an example of an additional drawing setting screen that the UI module 207 displays on the display 119 in the first embodiment.

The user can call an additional drawing setting window 501 from the application 204 or the OS 201 as needed and set additional drawing setting information.

The additional drawing setting window 501 has one or more additional drawing setting items 502. The one or more additional drawing setting items according to the present embodiment include "activate additional drawing", "type", "character string", "color", "position", "rotation angle", "size", and "transparency" but are not limited thereto in the present disclosure. Moreover, description of each item is not limited thereto. For example, "transparency" may be "print in foreground" instead. The settings for when the checkbox for "transparency" is checked may be the same as those for when the checkbox for "print in foreground" is not checked.

The one or more additional drawing setting items 502 have a corresponding input user interface 503. The user can set additional drawing setting information by inputting desired setting values in the input user interface 503 using the pointing device 117, the keyboard 118, or the like.

After setting the additional drawing setting information as above, the user presses down a cancel button 504 in a case where the user does not want to reflect the settings, and presses down an OK button 505 in a case where the user wants to reflect the settings.

Note that a method may be used in which the printer driver 206 has, as preset information, combinations of information items for part or the entirety of the additional drawing setting information and which enables the user to select a certain combination from the preset information. Moreover, a method may be used in which the additional drawing setting information is determined regardless of an input made by the user.

Figure 6:
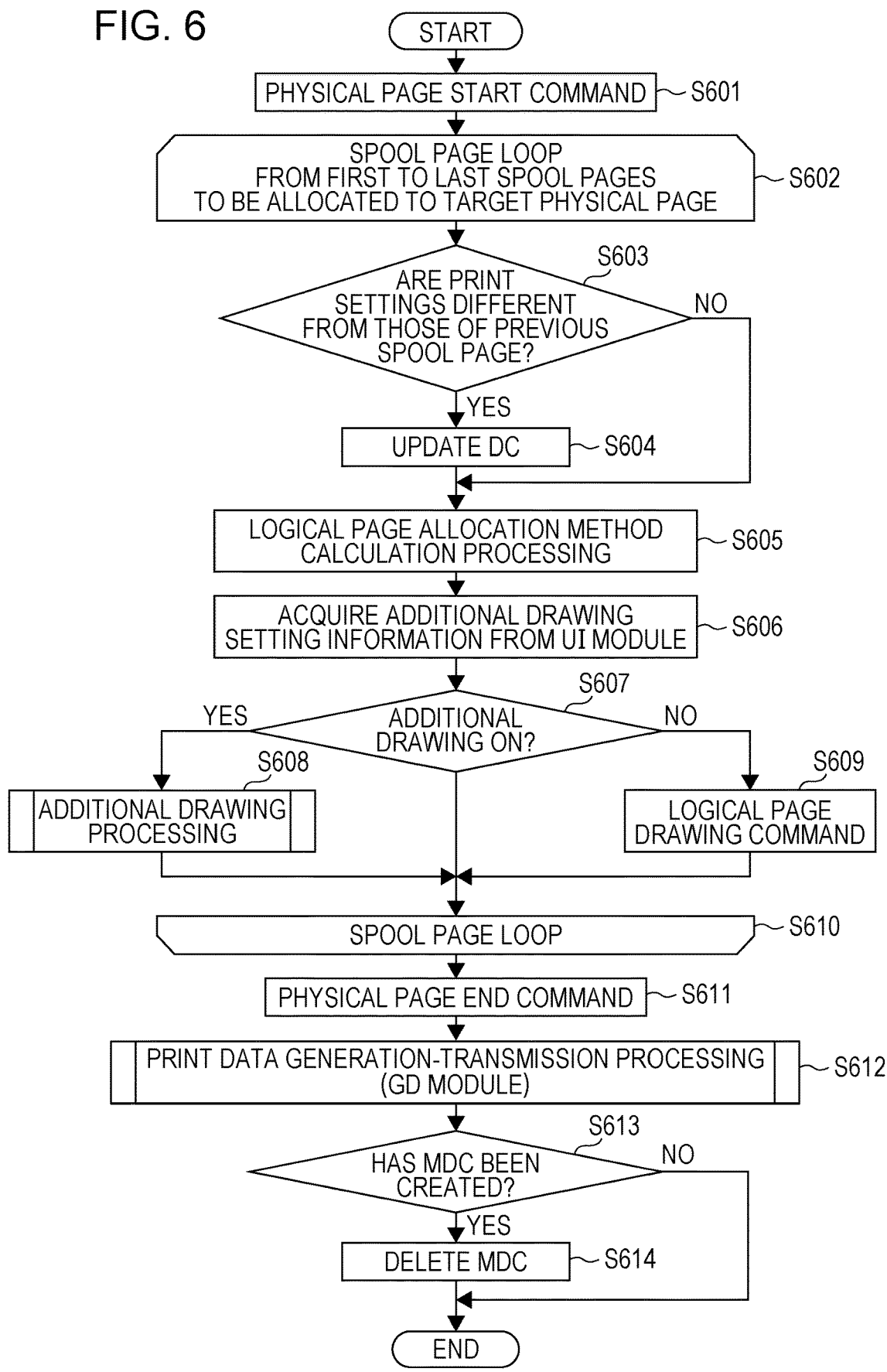
FIG. 6 is a flow chart illustrating page drawing processing according to the present embodiment.

FIG. 6 is a flow chart illustrating an example of operations in page drawing processing performed by the print processor 205 according to the present embodiment.

In S601, the print processor 205 issues a physical page start command to the GDI 202 and performs processes in S602 to S610.

The processes in S602 to S610 correspond to loop processing in which the individual processes are performed on individual spool pages (from the first spool page to the last spool page) to be allocated to a physical page, which is a processing target, among spool pages in the EMF spool file 301. That is, in a case where one spool page is allocated as a logical page to a target physical page, loop processing is performed one time. In a case where four spool pages are allocated as a logical page to a target physical page, loop processing is performed four times.

In the following, the processes in S602 to S610 will be described in detail.

In S603, in a case where the previously allocated spool page is present, the print processor 205 compares print settings of the previously allocated spool page with those of a spool page that the print processor 205 is currently allocating. In a case where a change is made to an item that affects allocation among the print settings (when YES in S603), the "printer device context" is updated in S604, and the process proceeds to S605. The "printer device context" can be updated by, for example, calling ResetDC, which is an API function of the GDI 202.

In contrast, in a case where a change is not made from the print settings for the previously allocated spool page to those for the spool page that the print processor 205 is currently allocating (when NO in S603), the print processor 205 causes the process to proceed to S605.

In S605, the print processor 205 performs logical page allocation method calculation processing.

From a calculation result in S605, the coordinates, size, way of clipping, and orientation of a logical page are determined for a case where the logical page is allocated to a physical page. Thereafter, SetWorldTransform, which is an API function of the GDI 202, is called as needed, and a command to convert allocation coordinates may be issued by applying settings for two-dimensional linear conversion (rotation, enlargement/reduction, movement, and so forth) to the "printer device context".

In S606, the print processor 205 acquires additional drawing setting information from the UI module 207.

In S607, the print processor 205 determines whether an additional drawing function is ON (active) or not from the additional drawing setting information acquired in S606 described above. In a case where the additional drawing function is ON (when YES in S607), the print processor 205 performs additional drawing processing (S608). Details of the additional drawing processing will be described later. After performing the processing in S608, the print processor 205 causes the process to proceed to S610.

In contrast, in a case where the additional drawing function is not ON (when NO in S607), the print processor 205 causes the process to proceed to S609.

Next, in S609, the print processor 205 issues the logical page drawing command to the GDI 202. Through the processing, the OS 201 is notified of the logical page allocation method calculated in S605 described above. After performing the processing in S609, the print processor 205 causes the process to proceed to S610.

In S610, the print processor 205 repeats the loop from S602 to S610 in a case where logical page allocation has not been completed for the target physical page. In contrast, in a case where logical page allocation has been completed for the target physical page, the print processor 205 causes the process to proceed to S611.

In S611, the print processor 205 issues the physical page end command to the GDI 202.

In response to the physical page end command in S611 described above, the GD module 208 starts print data generation-transmission processing in S612. Details of this print data generation-transmission processing will be described later.

In S613, the print processor 205 determines whether or not a "memory device context" has been created. In a case where a "memory device context" has been created (when YES in S613), the print processor 205 deletes the "memory device context", and ends processing for this flow chart.

In contrast, in a case where a "memory device context" has not been created (when NO in S613), the print processor 205 ends processing for this flow chart.

In the above, an example of the operations in the page drawing processing performed by the print processor 205 at the time of performing additional drawing processing has been described.

Figure 7:
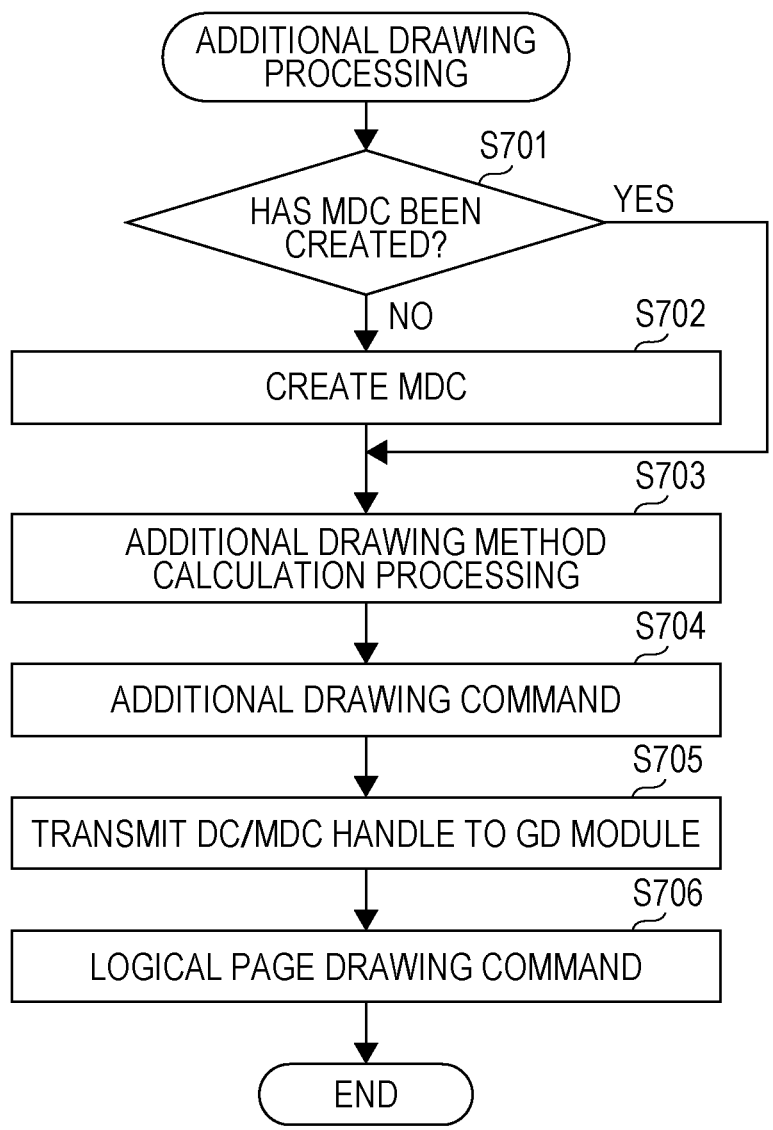
FIG. 7 is a flow chart illustrating additional drawing processing according to the first embodiment.

FIG. 7 is a flow chart illustrating an example of operations in the additional drawing processing (S608 in FIG. 6) performed by the print processor 205 according to the first embodiment.

In S701, the print processor 205 determines whether a "memory device context" has been created. In a case where a "memory device context" has not been created (when NO in S701), the print processor 205 creates a "memory device context" (S702) and causes the process to proceed to S703.

In contrast, in a case where a "memory device context" has been created (when YES in S701), the print processor 205 causes the process to proceed to S703.

Note that the "memory device context" created in S702 described above is a device context for abstracting a virtual drawing region for performing additional drawing processing. Note that when this "memory device context" is created, the OS 201 is not notified of this as a print page. Thus, it can be prevented that the OS 201 recognizes an extra page for additional drawing processing.

In S703, the print processor 205 performs additional drawing method calculation processing. Through the processing, a drawing method is calculated on the basis of the additional drawing setting information. For example, the print processor 205 determines the size of text or an image to be drawn through additional drawing processing on the basis of a value set in "size" in the additional drawing setting information, or determines coordinates, where additional drawing processing is to be performed, on the basis of a value set in "position" in the additional drawing setting information. In addition to this, the print processor 205 can determine the coordinates, orientation, size, and so forth of an additional drawing using a calculation result of the logical page allocation method calculated in S605 described above. This is because an additional drawing can be drawn on each logical page by determining the coordinates, orientation, size, and so forth of an additional drawing in this manner, and even in a case where print settings are different between spool pages, additional drawing processing appropriate for the print settings of each spool page can be performed on a corresponding logical page.

In S704, the print processor 205 issues an additional drawing command by calling the API of the GDI 202 for the drawing region of the "memory device context" on the basis of the calculation result in S703 described above.

In S705, the print processor 205 notifies the GD module 208 of a device context handle and a memory device context handle via the GDI 202. In this method, ExtEscape, which is an API function of the GDI 202, is specifically used in the present embodiment; however, this method is not the only method, and notifications may be issued using any method.

Next, in S706, the print processor 205 issues the logical page drawing command to the GDI 202.

In the above, an example of the operations in the additional drawing processing (S608 in FIG. 6) performed by the print processor 205 according to the first embodiment has been described.

FIG. 8 is a flow chart illustrating an example of operations in the print data generation-transmission processing (S612 in FIG. 6) performed by the GD module 208 according to the first embodiment.

In S801, the GD module 208 performs drawing processing for the drawing content issued by the application 204. This processing is performed by the GDI 202 calling a drawing function.

In S802, the GD module 208 determines whether additional drawing is ON or not. In the present embodiment, driver setting information is stored in a DEVMODE structure. Thus, in the present embodiment, in a case where the GD module 208 determines the driver setting information, the GD module 208 directly or indirectly refers to a value stored in the DEVMODE structure; however, the present disclosure is not limited to this case.

In a case where additional drawing is ON (when YES in S802), the GD module 208 causes the process to proceed to S803.

In contrast, in a case where additional drawing is not ON (when NO in S802), the GD module 208 causes the process to proceed to S806.

In S803, the GD module 208 determines whether a transparency setting for additional drawing is ON or not. In a case where the transparency setting is ON (when YES in S803), the GD module 208 causes the process to proceed to S804.

In S804, using a Boolean AND operation, the GD module 208 combines the drawing content, which is to be drawn, issued by the application 204 with an additional drawing, and generates post-combination raster data. The Boolean AND operation described above is performed in the present embodiment as follows. When bit block transfer of the "memory device context" is performed for the drawing region of the "printer device context", the GD module 208 obtains logical products of bits of color information regarding individual pixels having the same coordinates to calculate individual bits of color information regarding individual post-combination pixels. In order to perform the combining method, for example, it is sufficient that SRCAND be specified as a raster operation code using BitBlt, which is an API function of the GDI 202. For pixels where the drawing content issued by the application 204 and the additional drawing overlap, color mixing is performed by using the combining method, and the drawing content drawn under the additional drawing can be expressed such that the drawing content appears in a see-through manner.

After performing processing in S804 described above, the GD module 208 causes the process to proceed to S806.

In contrast, in a case where the transparency setting is not ON (when NO in S803), the GD module 208 causes the process to proceed to S805.

In S805, the GD module 208 combines the drawing content, which is to be drawn, issued by the application 204 with an additional drawing such that the additional drawing is disposed in front of the drawing of the drawing content issued by the application 204, and generates post-combination raster data. In the present embodiment, the GD module 208 performs combination by performing, for the drawing region of the "printer device context", bit block transfer of the memory device context. In order to perform the combination, for example, it is sufficient that TransparentBlt, which is an API function of the GDI 202, be used, and the background color of the memory device context be specified as a transparent color when the function is called. By using the combining method, a drawing result can be obtained in which additional drawing processing is performed in front of the drawing content issued by the application 204.

After performing processing in S805 described above, the GD module 208 causes the process to proceed to S806.

In S806, the GD module 208 performs print data generation processing on the basis of the post-combination raster data.

In S807, the GD module 208 performs print data transmission processing for transmitting the print data generated in S806 described above to the print apparatus.

In the above, an example of the operations in the print data generation-transmission processing (S612 in FIG. 6) performed by the GD module 208 according to the first embodiment has been described.

Figure 9A:
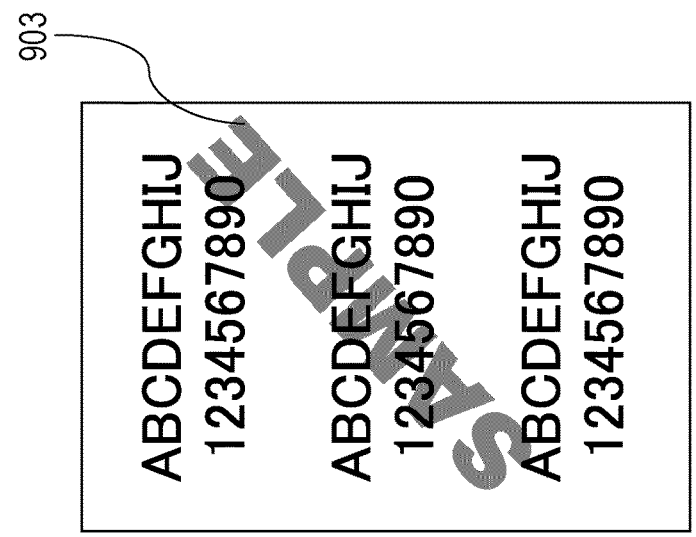
FIGS. 9A to 9C include diagrams schematically illustrating examples of post-combination raster data according to the first embodiment.
Figure 9B:
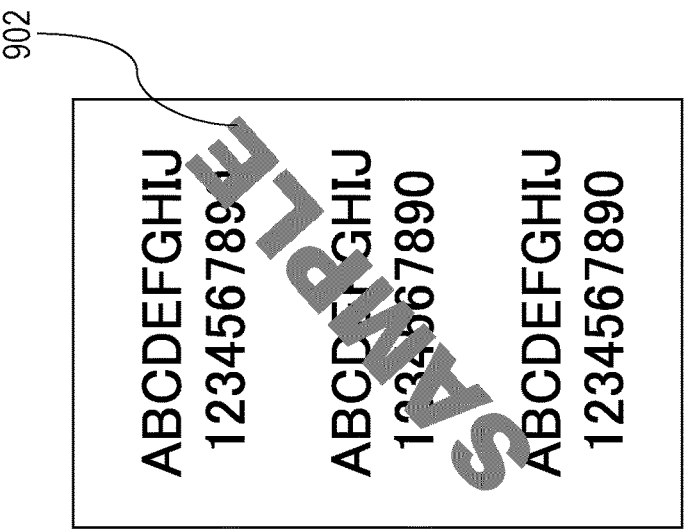
Figure 9C:
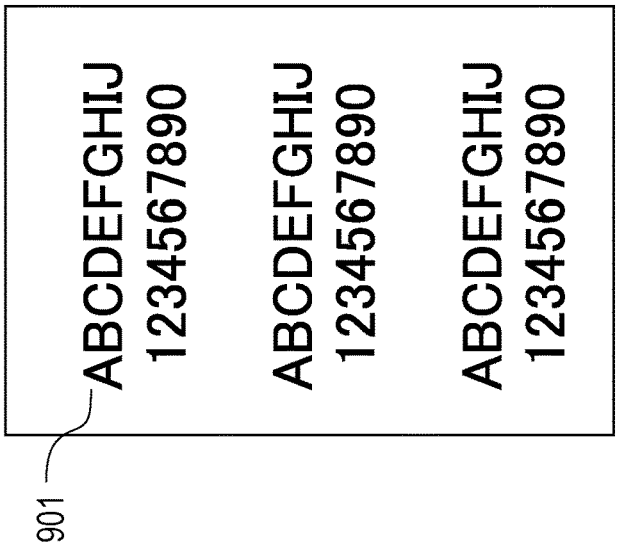

FIGS. 9A to 9C include diagrams schematically illustrating examples of post-combination raster data for a case where one spool page is allocated as a logical page to one physical page in the first embodiment.

Suppose that a result as in FIG. 9A is obtained in a case where additional drawing setting is OFF. In FIG. 9A, 901 denotes a drawing result of the drawing content issued by the application 204.

When the additional drawing setting is ON and the transparency setting is OFF, post-combination raster data as in FIG. 9B is obtained. In FIG. 9B, 902 denotes a drawing result of an additional drawing drawn in the foreground of the physical page.

When the additional drawing setting is ON and the transparency setting is ON, post-combination raster data as in FIG. 9C is obtained. In FIG. 9C, 903 denotes a drawing result of an additional drawing synthesized using a Boolean AND operation, and a drawing effect such as transparency can be obtained.

FIGS. 10A to 10C include diagrams schematically illustrating examples of post-combination raster data for a case where two spool pages are allocated as logical pages to one physical page in the first embodiment.

FIG. 10A, FIG. 10B, and FIG. 10C are results drawn with the same additional drawing settings as FIG. 9A, FIG. 9B, and FIG. 9C in a respective manner. In this manner, according to the present embodiment, additional drawing processing can be performed on a plurality of logical pages.

FIGS. 11A to 11C include diagrams schematically illustrating examples of post-combination raster data for a case where two logical pages having different print settings from each other are allocated to one physical page in the first embodiment.

Note that a spool page having a vertical orientation setting is allocated to the first logical page, and a spool page having a horizontal orientation setting is allocated to the second logical page. In this case, suppose that the second logical page is calculated by the print processor 205 such that the second logical page is rotated 90° counterclockwise in order to have a larger allocation area, and is allocated.

FIG. 11A, FIG. 11B, and FIG. 11C are results drawn with the same additional drawing settings as FIG. 9A, FIG. 9B, and FIG. 9C in a respective manner. In the present embodiment, as illustrated in FIG. 11B and FIG. 11C, an additional drawing may be drawn so as to match the orientation of each logical page. In this manner, according to the present embodiment, appropriate additional drawing processing can be performed on a plurality of logical pages having different print settings.

In the above, according to the present embodiment, it is possible to perform additional drawing processing in front of drawing content issued by an application, and a visual effect such as transparency processing can be provided to an additional drawing as needed. Since a page start notification or a page end notification is not issued extra in the present embodiment, an actual number of pages to be printed and the number of pages to be reported to the OS can be made to match each other. Thus, in a case where the number of print pages is displayed using a function of the OS, the user may be less likely to be confused. In this manner, a problem of the existing technology can be solved.

Second Embodiment

In the first embodiment, a Boolean AND operation is used as a method for obtaining a transparency effect on an additional drawing. Note that in a case where the color of an additional drawing is set to white in this method, there may be a case where drawing is not performed, and a print result is not obtained as intended by the user due to the nature of a Boolean AND operation. Thus, in the present embodiment, a method for performing pseudo transparency processing will be described as a method for obtaining a transparency effect on an additional drawing. In the method, pseudo transparency processing is performed by performing a halftone process on an additional drawing and then drawing the additional drawing in front of the drawing content issued by the application 204. Note that the present embodiment is substantially the same as the first embodiment unless otherwise stated.

Figure 12:
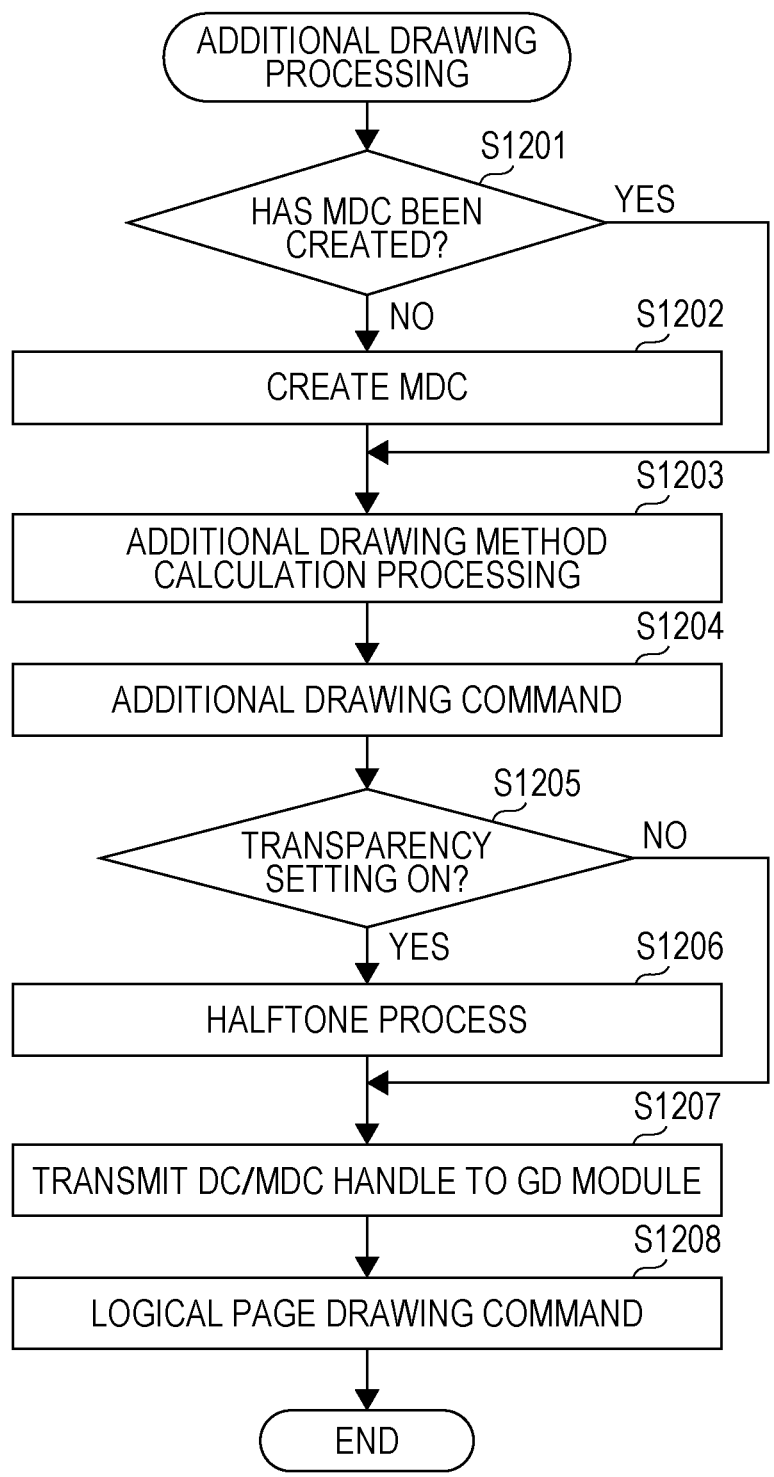
FIG. 12 is a flow chart illustrating additional drawing processing according to a second embodiment.

FIG. 12 is a flow chart illustrating an example of operations in the additional drawing processing (S608 in FIG. 6) performed by the print processor 205 according to a second embodiment.

Processing from S1201 to S1204 is substantially the same as that from S701 to S704 according to the first embodiment.

In S1205, the print processor 205 determines whether the transparency setting for additional drawing is ON or not. In a case where the transparency setting is ON (when YES in S1205), the print processor 205 causes the process to proceed to S1206.

In S1206, the print processor 205 performs a halftone process on the drawing region of the "memory device context", and the print processor 205 causes the process to proceed to S1207.

The halftone process can be performed using any method; however, in the present embodiment, the halftone process is performed by overwriting the drawing region of the memory device context using a pattern in which squares having three pixels per side and having a background color of the memory device context are arranged in an alternating manner. Note that the length of each side of each square is an example and is not limited to this length. Moreover, the method for performing the halftone process is not limited thereto.

In contrast, in a case where the transparency setting is not ON (when NO in S1205), the print processor 205 causes the process to proceed to S1207.

Processing in S1207 and S1208 is substantially the same as that in S705 and S706 according to the first embodiment.

In the above, an example of the operations in the additional drawing processing (S608) performed by the print processor 205 according to the second embodiment has been described.

Figure 13:
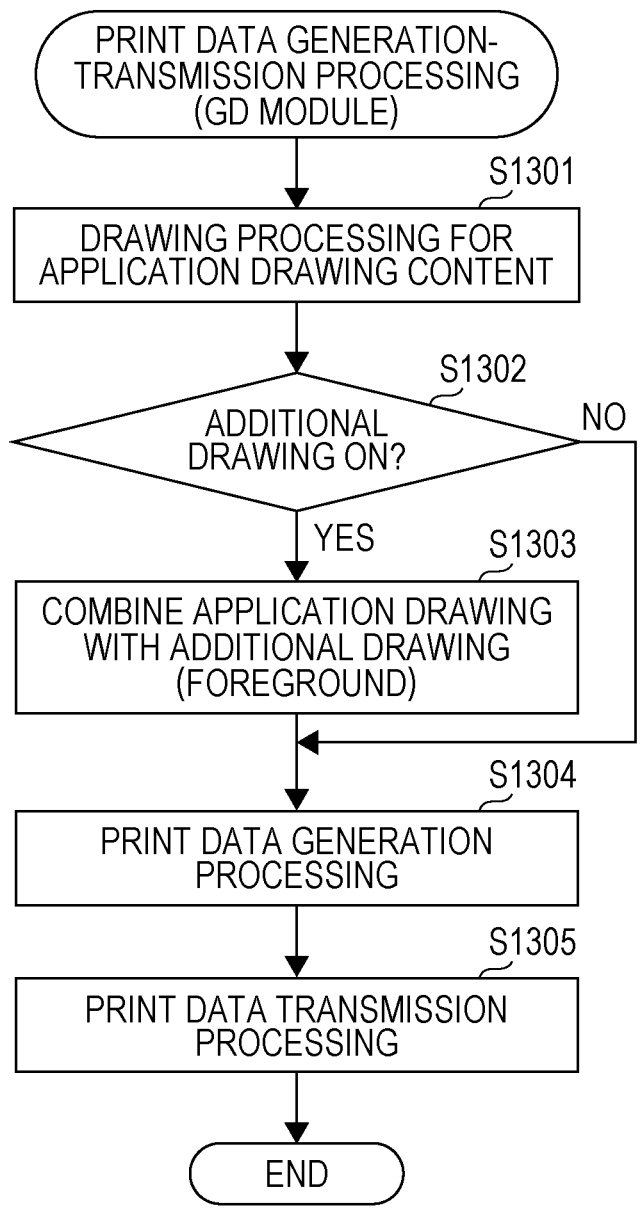
FIG. 13 is a flow chart illustrating print data generation-transmission processing according to the second embodiment.

FIG. 13 is a flow chart illustrating an example of operations in the print data generation-transmission processing (S612 in FIG. 6) performed by the GD module 208 according to the second embodiment.

Processing in S1301 is substantially the same as that in S801 according to the first embodiment.

In S1302, the GD module 208 determines whether the additional drawing is ON or not.

In a case where the additional drawing is ON (when YES in S1302), the GD module 208 causes the process to proceed to S1303.

In contrast, in a case where the additional drawing is not ON (when NO in S1302), the GD module 208 causes the process to proceed to S1304.

Processing from S1303 to S1305 is substantially the same as that from S805 to S807 according to the first embodiment.

In the above, an example of the operations in the print data generation-transmission processing (S612) performed by the GD module 208 according to the second embodiment has been described.

Figure 14A:
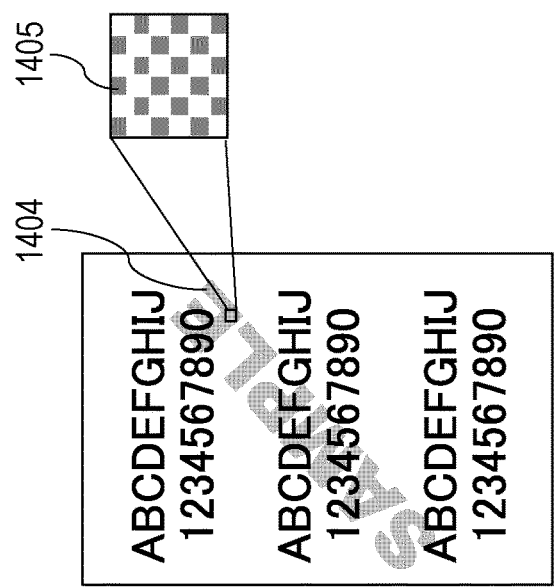
FIGS. 14A to 14C include diagrams schematically illustrating examples of post-combination raster data according to the second embodiment.
Figure 14B:
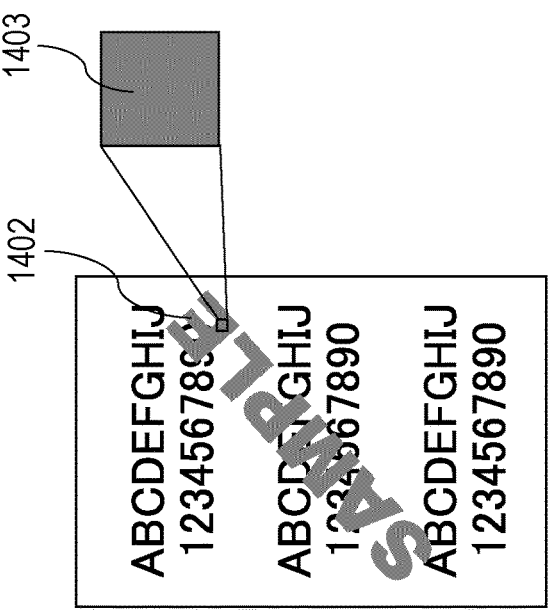
Figure 14C:
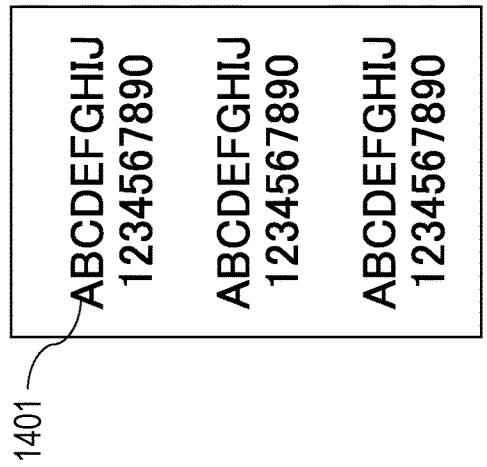

FIGS. 14A to 14C include diagrams schematically illustrating examples of post-combination raster data according to the second embodiment.

Suppose that post-combination raster data as in FIG. 14A is obtained in a case where the additional drawing setting is OFF. In FIG. 14A, 1401 denotes a drawing result of the drawing content issued by the application 204.

In this case, when the additional drawing setting is ON and the transparency setting is OFF, post-combination raster data as in FIG. 14B is obtained. In FIG. 14B, 1402 denotes a drawing result of an additional drawing drawn in the foreground. Moreover, 1403 denotes a region of 18 pixels× 18 pixels that is obtained by enlarging the drawing result of the additional drawing. In the present embodiment, when the transparency setting is OFF, the additional drawing is expressed in a single solid color as denoted by 1403.

In contrast, when the additional drawing setting is ON and the transparency setting is ON, post-combination raster data as in FIG. 14C is obtained. In FIG. 14C, 1404 denotes a drawing result of an additional drawing that is subjected to a halftone process and then drawn in the foreground. Moreover, 1405 denotes a region of 18 pixels×18 pixels that is obtained by enlarging the drawing result of the additional drawing. In this manner, by performing the halftone process on the additional drawing, transparency processing can be performed on the additional drawing.

In this manner, in the present embodiment, the following effect can be obtained in addition to the effect described in the first embodiment. That is, regardless of the setting in additional drawing color (even in a case where the color of additional drawing is set to white), an additional drawing having a transparency effect can be drawn on the drawing content issued by an application.

Third Embodiment

In the second embodiment, a method is used in which a transparency effect is obtained by performing the halftone process on an additional drawing. Note that in a case where the halftone repeating unit is small in the halftone process, data size is not easily reduced even when image compression is performed. Thus, in a case where post-combination raster data generated by the GD module 208 is compressed and then transmitted to the print apparatus 102, this may result in reduced print speed. In contrast, in a case where the halftone repeating unit is large, when the size of text to be drawn through additional drawing processing is small, this may reduce readability of the text. Thus, in the present embodiment, a method for changing the size of the halftone repeating unit for an additional drawing in accordance with the size of the additional drawing will be described. Note that the present embodiment is substantially the same as the second embodiment unless otherwise stated.

Figure 15:
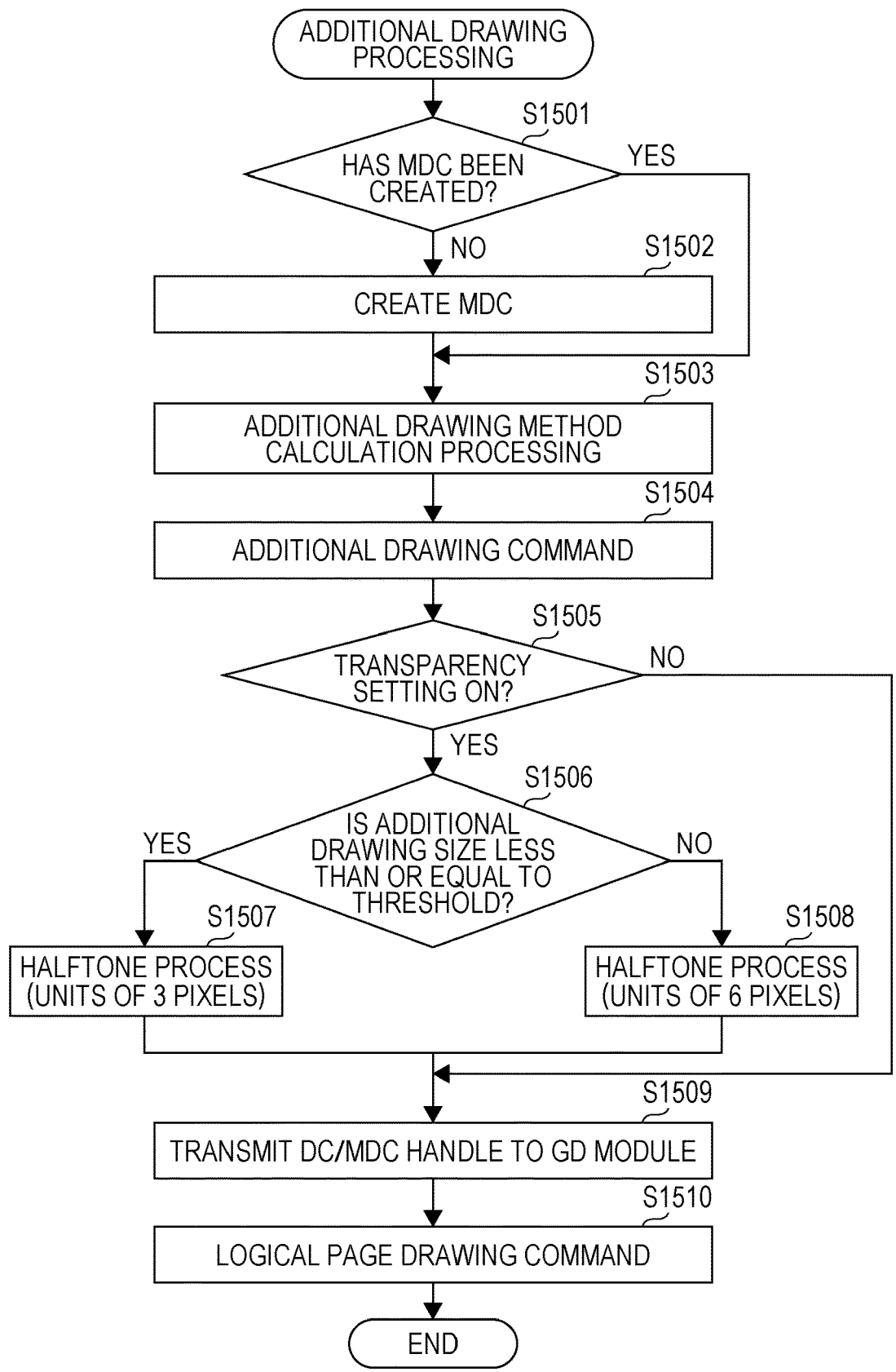
FIG. 15 is a flow chart illustrating additional drawing processing according to a third embodiment.

FIG. 15 is a flow chart illustrating an example of operations in the additional drawing processing (S608 in FIG. 6) performed by the print processor 205 according to a third embodiment.

Processing from S1501 to S1504 is substantially the same as that from S1201 to S1204 according to the second embodiment.

In S1505, the print processor 205 determines whether the transparency setting for additional drawing is ON or not. In a case where the transparency setting is ON (when YES in S1505), the print processor 205 causes the process to proceed to S1506.

In contrast, in a case where the transparency setting is not ON (when NO in S1505), the print processor 205 causes the process to proceed to S1509.

In S1506, the print processor 205 determines the size of an additional drawing. In the present embodiment, the print processor 205 refers to a value set in "size" in the additional drawing setting information and determines whether the value is less than or equal to a certain threshold. In a case where the value is less than or equal to the certain threshold (when YES in S1506), the print processor 205 causes the process to proceed to S1507.

In contrast, in a case where the value is not less than or equal to the certain threshold (when NO in S1506), the print processor 205 causes the process to proceed to S1508.

In each of S1507 and S1508, a halftone process is performed on the drawing region of the memory device context. In the present embodiment, the halftone process is performed by overwriting the drawing region of the memory device context using a pattern in which squares having a background color of the memory device context are arranged in an alternating manner. In this case, in S1507, the squares have three pixels per side. In contrast, in S1508, the squares have six pixels per side. Note that these lengths per side are examples, and are not limited to these lengths. The size of the additional drawing may be classified into one of three or more groups, and then a halftone process may be performed. In this case, the length of each side of each square is also classified into one of three or more groups.

After performing the halftone process in S1507 or S1508, the print processor 205 causes the process to proceed to S1509.

Processing in S1509 and S1510 is substantially the same as that in S1207 and S1208 according to the second embodiment.

In the above, an example of the operations in the additional drawing processing (S608 in FIG. 6) performed by the print processor 205 according to the third embodiment has been described.

Figure 16:
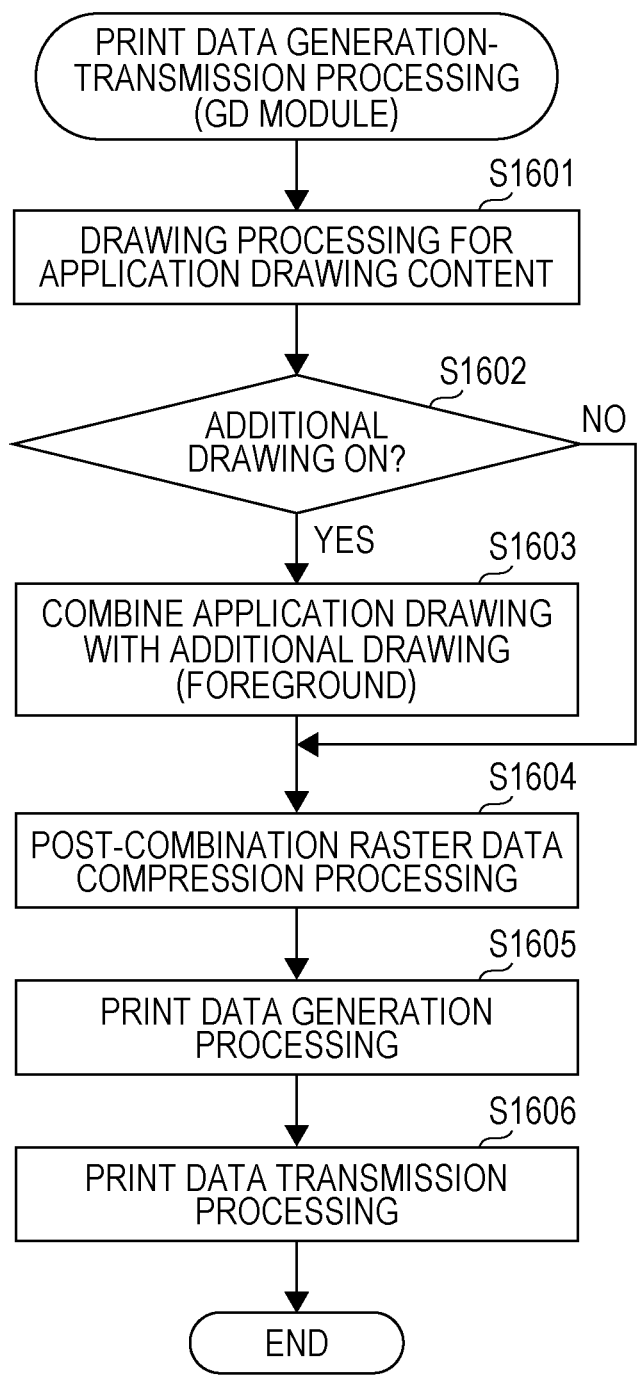
FIG. 16 is a flow chart illustrating print data generation-transmission processing according to the third embodiment.

FIG. 16 is a flow chart illustrating an example of operations in the print data generation-transmission processing (S612 in FIG. 6) performed by the GD module 208 according to the third embodiment.

Processing from S1601 to S1603 is substantially the same as that from S1301 to S1303 according to the second embodiment.

In S1604, the GD module 208 performs compression processing on the post-combination raster data. The compression processing can be performed using any known method. After performing processing in S1604, the GD module 208 causes the process to proceed to S1605.

Processing in S1605 and S1606 is substantially the same as that in S1304 and S1305 according to the second embodiment.

In the above, an example of the operations in the print data generation-transmission processing (S612 in FIG. 6) performed by the GD module 208 according to the third embodiment has been described.

FIGS. 17A to 17D include diagrams schematically illustrating examples of post-combination raster data according to the third embodiment.

Figure 17A:
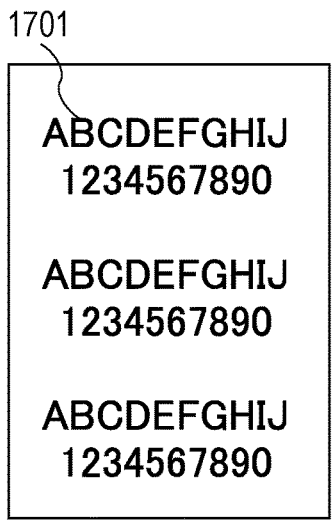
FIGS. 17A to 17D include diagrams schematically illustrating examples of post-combination raster data according to the third embodiment.

Suppose that post-combination raster data as in FIG. 17A is obtained in a case where the additional drawing setting is OFF. In FIG. 17A, 1701 denotes a drawing result of the drawing content issued by the application 204.

Figure 17B:
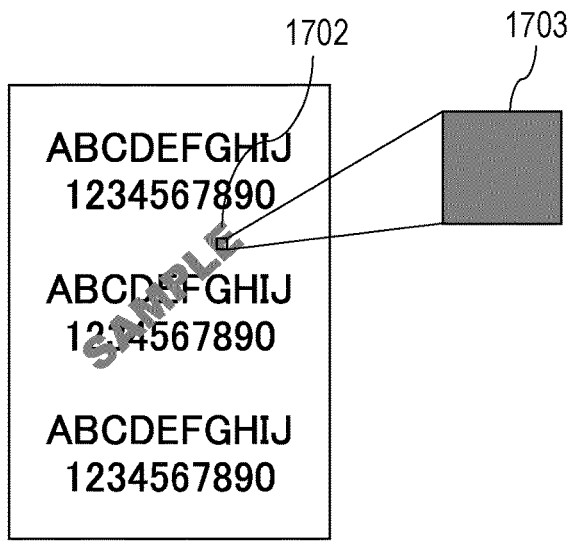

In this case, when the additional drawing setting is ON and the transparency setting is OFF, in a case where text size is less than or equal to a threshold, post-combination raster data as in FIG. 17B is obtained. In FIG. 17B, 1702 denotes a drawing result of an additional drawing drawn in the foreground. Moreover, 1703 denotes a region of 18 pixels× 18 pixels that is obtained by enlarging the drawing result of the additional drawing. In the third embodiment, when the transparency setting is OFF, the additional drawing is expressed in a single solid color as denoted by 1703.

Figure 17C:
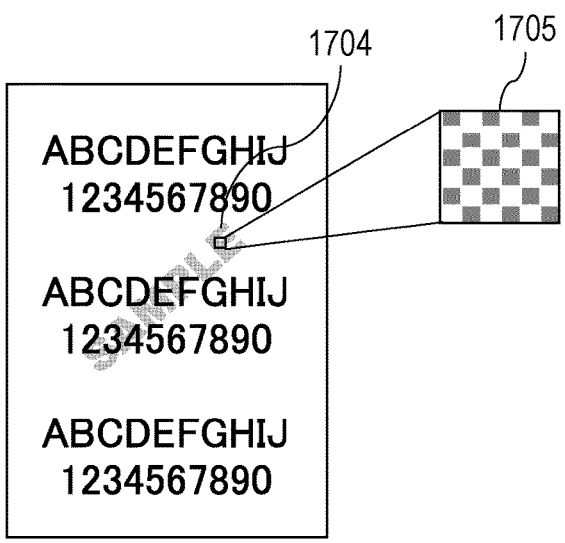

Moreover, when the additional drawing setting is ON and the transparency setting is ON, in a case where text size is less than or equal to the threshold, post-combination raster data as in FIG. 17C is obtained. In FIG. 17C, 1704 denotes a drawing result of an additional drawing that is subjected to a halftone process and then drawn in the foreground. Moreover, 1705 denotes a region of 18 pixels×18 pixels that is obtained by enlarging the drawing result of the additional drawing.

Figure 17D:
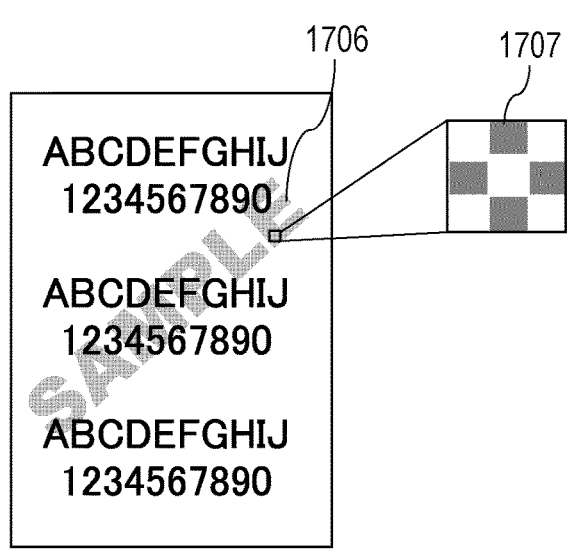

Moreover, when the additional drawing setting is ON and the transparency setting is ON, in a case where text size is greater than the threshold, post-combination raster data as in FIG. 17D is obtained. What is denoted by 1706 in FIG. 17D is substantially the same as what is denoted by 1704. Moreover, what is denoted by 1707 is substantially the same as what is denoted by 1705; however, the halftone-process repeating unit denoted by 1707 is larger than that denoted by 1705.

For the post-combination raster data illustrated in FIG. 17C, since the text size of the additional drawing is small, the halftone-process repeating unit is reduced in order to facilitate readability of the text drawn through additional drawing processing. In this case, the size of the additional drawing itself is small, and thus when image compression is performed on the post-combination raster data, the effect of the additional drawing on post-compression data size can be suppressed.

In contrast, for the post-combination raster data illustrated in FIG. 17D, since the text size of the additional drawing is large, the halftone-process repeating unit is increased in order to suppress an increase in data size when image compression is performed on the post-combination raster data. In this case, the size of the additional drawing itself is large. Thus, even when the halftone-process repeating unit is increased, the readability of the text is less likely to be reduced. Moreover, since the halftone-process repeating unit is large, post-compression data size can be reduced.

Through a method as described above, the following effect is obtained in the present embodiment in addition to the effects described in the first embodiment and the second embodiment. That is, in a case where image compression is performed and then print data is generated, an increase in the size of print data can be suppressed, and a decrease in transmission speed to the print apparatus can be suppressed without greatly reducing readability of an additional drawing.

Fourth Embodiment

In the third embodiment, a method has been described in which an appropriate halftone process for the size of an additional drawing is performed on the additional drawing to perform transparency processing on the additional drawing while suppressing a reduction in transmission speed to the print apparatus. Note that, in the halftone process, it may be undesirable in terms of print quality that the repeating pattern can be visually confirmed. Thus, in the present embodiment, an additional drawing method will be described in which an appropriate transparency effect is provided in terms of print quality by changing the size of the halftone-process repeating unit in accordance with a medium to be used in printing. Note that the present embodiment is substantially the same as the third embodiment unless otherwise stated. Suppose that, in the present embodiment, the user can preset, for the printer driver 206, information regarding the type of medium to be subjected to printing, and the print processor 205 can acquire the information regarding the type of medium to be subjected to printing from the UI module 207.

Figure 18:
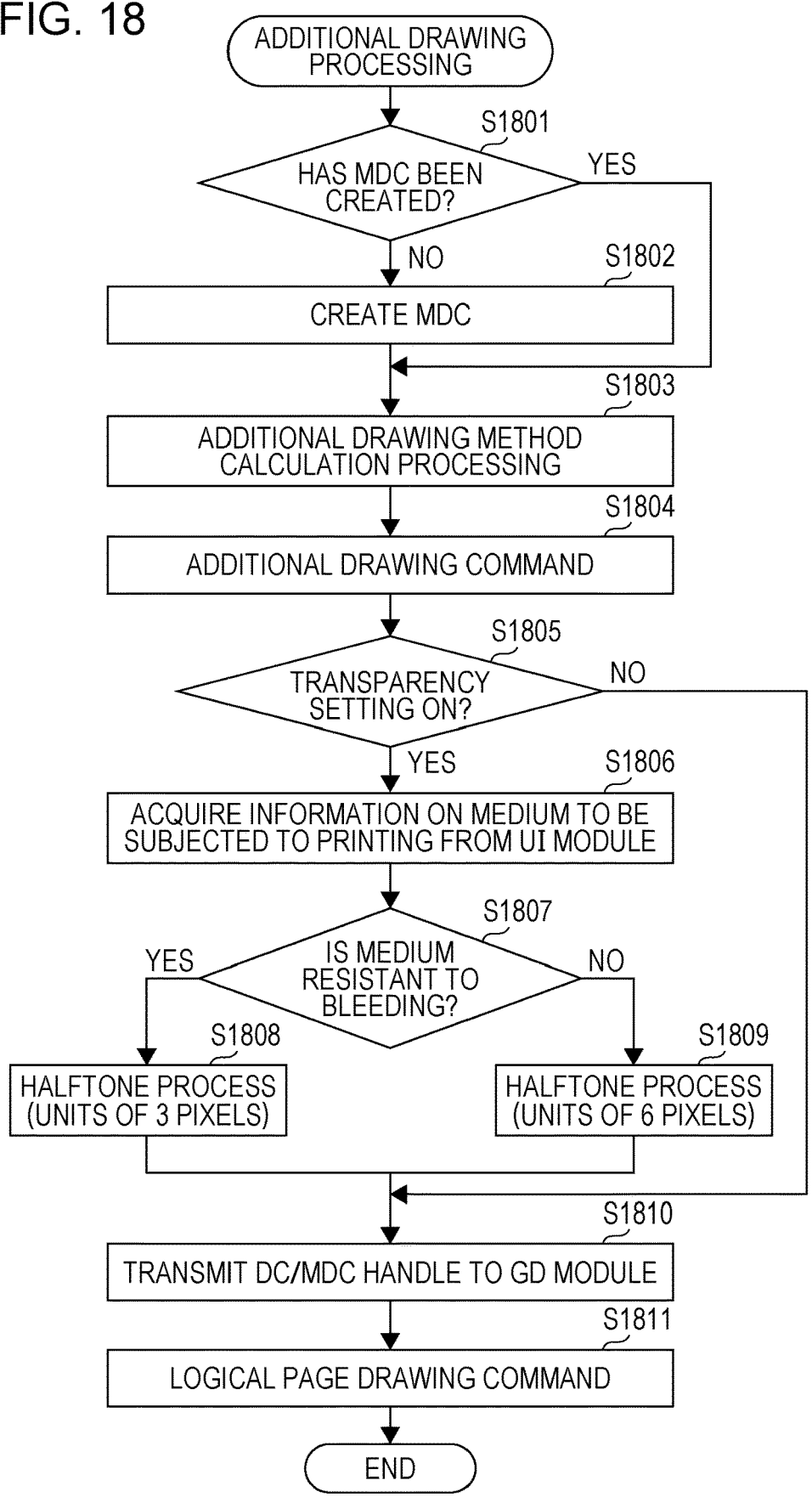
FIG. 18 is a flow chart illustrating additional drawing processing according to a fourth embodiment.

FIG. 18 is a flow chart illustrating an example of operations in the additional drawing processing (S608 in FIG. 6) performed by the print processor 205 according to a fourth embodiment.

Processing from S1801 to S1804 is substantially the same as that from S1501 to S1504 according to the third embodiment.

In S1805, the print processor 205 determines whether the transparency setting for additional drawing is ON or not. In a case where the transparency setting is ON (when YES in S1805), the print processor 205 causes the process to proceed to S1806.

In contrast, in a case where the transparency setting is not ON (when NO in S1805), the print processor 205 causes the process to proceed to S1810.

In S1806, the print processor 205 acquires, from the UI module 207, information on the type of medium to be subjected to printing, and causes the process to proceed to S1807. In the present embodiment, the print processor 205 is configured to be capable of determining, from the information on the type of medium to be subjected to printing, whether bleeding is less likely to occur on the medium when printing is performed on the medium. Note that this configuration is merely an example, and such a determination may be made by another module or component of a print data generation apparatus such as the UI module 207.

In S1807, the print processor 205 determines, from the information acquired in S1806 described above, whether or not the medium is resistant to bleeding. In a case where it is determined that the medium is resistant to bleeding (when YES in S1807), the print processor 205 causes the process to proceed to S1808.

In contrast, in a case where it is determined that the medium is not resistant to bleeding (when NO in S1805), the print processor 205 causes the process to proceed to S1809.

Processing from S1808 to S1811 is substantially the same as that from S1507 to S1510 according to the third embodiment.

In the above, an example of the operations in the additional drawing processing (S608 in FIG. 6) performed by the print processor 205 according to the fourth embodiment has been described.

FIGS. 19A to 19D include diagrams schematically illustrating examples of post-combination raster data according to the fourth embodiment.

Figure 19A:
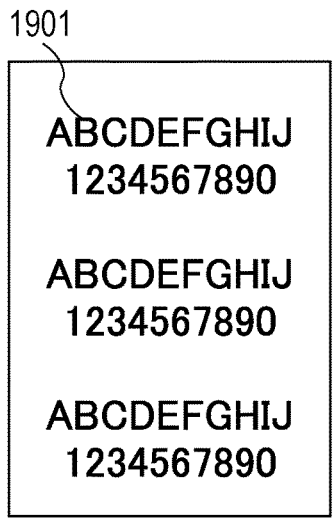
FIGS. 19A to 19D include diagrams schematically illustrating examples of post-combination raster data according to the fourth embodiment.

Suppose that post-combination raster data as in FIG. 19A is obtained in a case where the additional drawing setting is OFF. In FIG. 19A, 1901 denotes a drawing result of the drawing content issued by the application 204.

Figure 19B:
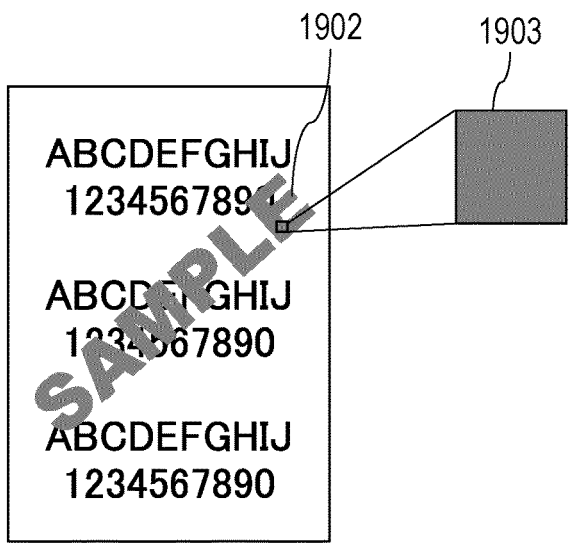

In this case, when the additional drawing setting is ON and the transparency setting is OFF, post-combination raster data as in FIG. 19B is obtained. In FIG. 19B, 1902 denotes a drawing result of an additional drawing drawn in the foreground. 1903 denotes a region of 18 pixels×18 pixels that is obtained by enlarging the drawing result of the additional drawing. In the present embodiment, when the transparency setting is OFF, the additional drawing is expressed in a single solid color as denoted by 1903.

Figure 19C:
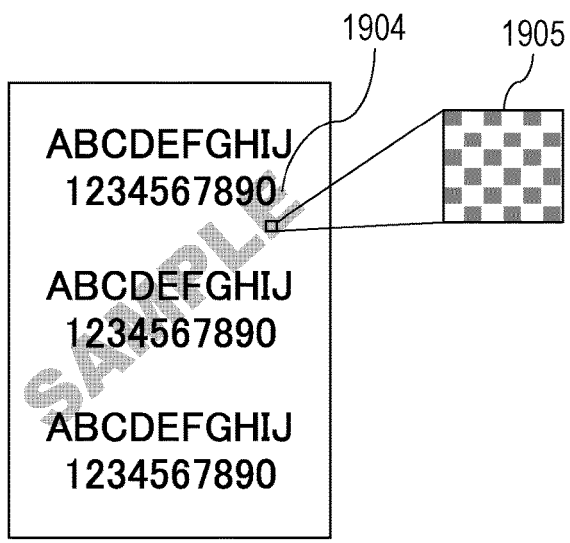

Moreover, when the additional drawing setting is ON and the transparency setting is ON, in a case where a set medium is a medium that is resistant to bleeding, post-combination raster data as in FIG. 19C is obtained. In FIG. 19C, 1904 denotes a drawing result of an additional drawing that is subjected to a halftone process and then drawn in the foreground. 1905 denotes a region of 18 pixels×18 pixels that is obtained by enlarging the drawing result of the additional drawing.

Figure 19D:
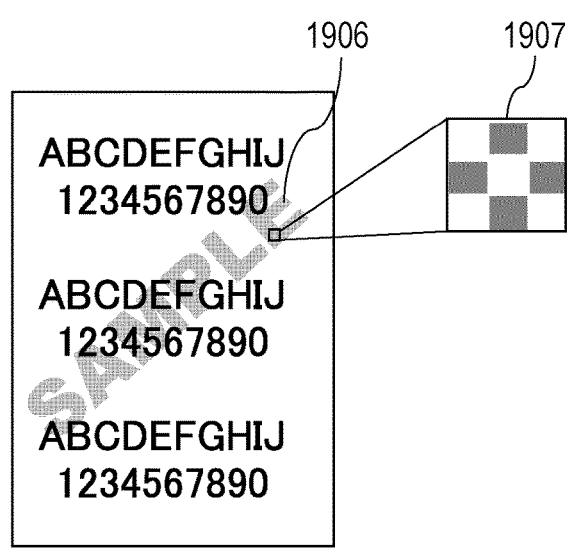

Moreover, when the additional drawing setting is ON and the transparency setting is ON, in a case where a set medium is a medium that is not resistant to bleeding, post-combination raster data as in FIG. 19D is obtained. What is denoted by 1906 in FIG. 19D is substantially the same as what is denoted by 1904. Moreover, what is denoted by 1907 is substantially the same as what is denoted by 1905; however, the halftone-process repeating unit denoted by 1907 is larger than that denoted by 1905.

In a case where it is undesirable in terms of print quality that the repeating pattern can be visually confirmed, the halftone-process repeating unit can be reduced, as illustrated in FIG. 19C, for a medium that is resistant to bleeding. In contrast, for a medium that is not resistant to bleeding, even when the halftone-process repeating unit is increased as in FIG. 19D, the repeating pattern is less likely to be visually confirmed due to bleeding at the time of printing.

Generally, media that are not resistant to bleeding such as plain paper tend to be inexpensive and are often used for high-volume printing and draft printing. In this case, print speed is important. As described in the third embodiment, by increasing the size of the repeating unit, an increase in the size of print data can be suppressed, and a decrease in print speed can be suppressed. In contrast, media that are resistant to bleeding such as glossy paper tend to be expensive and are often used for small-volume printing. In this case, print quality is more important than print speed. That is, in a case where additional drawing processing is performed in printing for a medium that is resistant to bleeding, a decrease in print quality can be reduced by reducing the size of the repeating unit.

As described above, the following effect is obtained in the present embodiment in addition to the effects described in the first embodiment and the second embodiment. That is, in a case where image compression is performed and then print data is generated, printing can be executed with appropriate print quality or at appropriate print speed in accordance with a set medium.

Fifth Embodiment

In the fourth embodiment, a method has been described in which the size of the halftone-process repeating unit is changed in accordance with whether a set medium is a medium that is resistant to bleeding, and printing is executed with appropriate print quality or at appropriate print speed. This configuration is applicable not only to a medium but also to another main body configuration such as a color material (a printing agent). Thus, in the present embodiment, a print data generation apparatus will be described in which the print processor 205 can acquire information on a mounted ink tank from the print apparatus 102 and is configured to be capable of determining, from the information regarding the ink tank, whether or not the ink is likely to bleed. Note that the present embodiment is substantially the same as the fourth embodiment unless otherwise stated.

Figure 20:
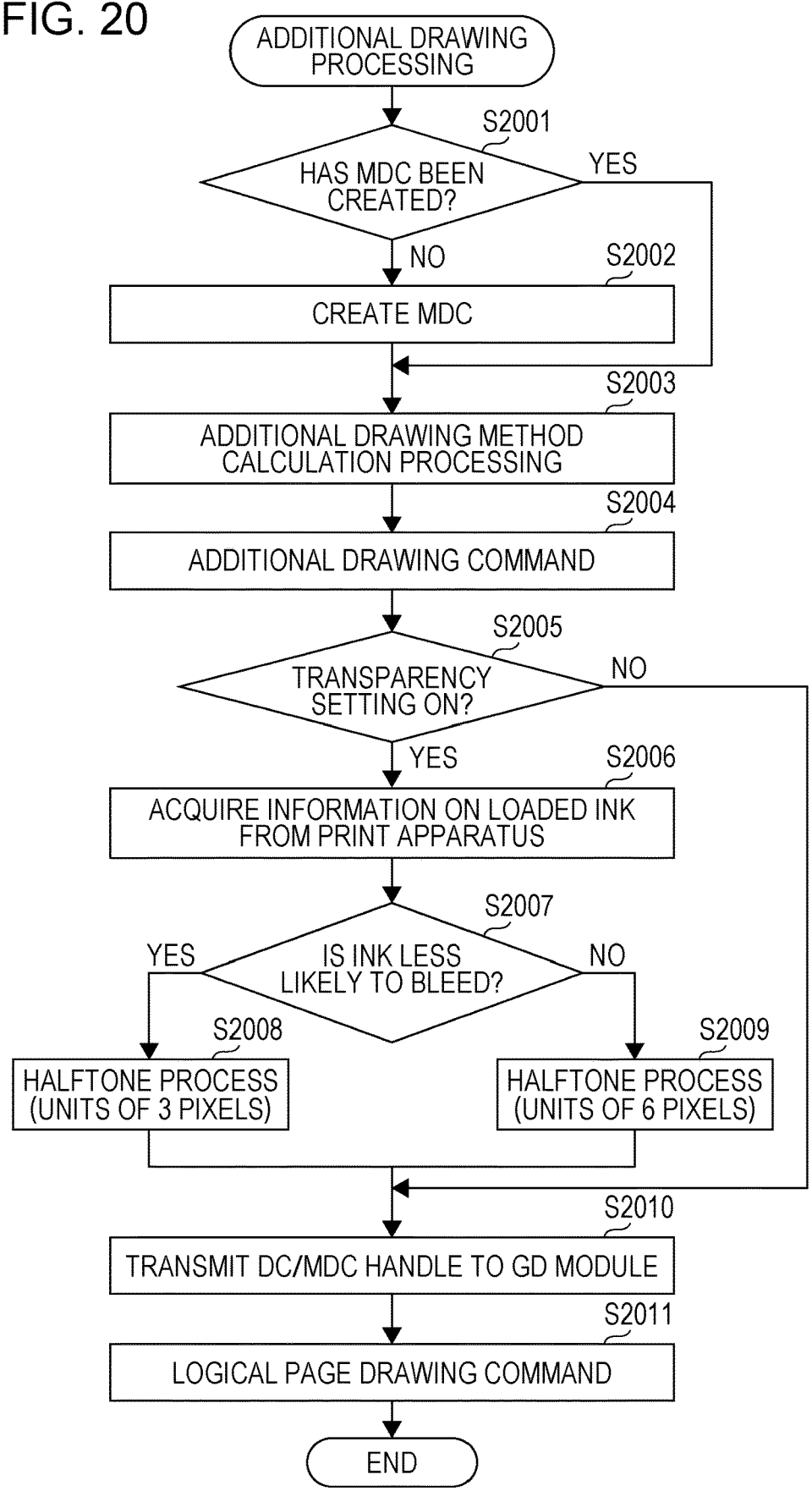
FIG. 20 is a flow chart illustrating additional drawing processing according to a fifth embodiment.

FIG. 20 is a flow chart illustrating an example of operations in the additional drawing processing (S608 in FIG. 6) performed by the print processor 205 according to a fifth embodiment. Processing from S2001 to S2005 and processing from S2008 to S2011 are substantially the same as processing from S1801 to S1805 and processing from S1808 to S1811 according to the fourth embodiment.

In S2006, the print processor 205 acquires information on the mounted ink tank from the print apparatus 102 and causes the process to proceed to S2007. In the present embodiment, the print processor 205 is configured to be capable of determining, from the information regarding the ink tank, whether bleeding is less likely to occur when printing is performed. Note that this configuration is merely an example, and such a determination may be made by another module or component of the print data generation apparatus such as the UI module 207. Moreover, in a case where the print apparatus has a configuration in which a plurality of ink tanks are mounted, any one or more ink tanks can be used to determine the likelihood of ink bleeding. For example, the print apparatus may be configured such that an ink tank to be used for determination is selected on the basis of "color" setting information in the additional drawing setting information, or may be configured such that only the black ink tank is always used for determination.

In S2007, the print processor 205 determines, from the information acquired in S2006 described above, whether ink is less likely to bleed. In a case where it is determined that ink is less likely to bleed (when YES in S2007), the print processor 205 causes the process to proceed to S2008. In contrast, in a case where it is determined that ink is likely to bleed (when NO in S2007), the print processor 205 causes the process to proceed to S2009.

Processing from S2008 to S2011 is substantially the same as that from S1808 to S1811 according to the fourth embodiment.

In the above, an example of the operations in the additional drawing processing (S608 in FIG. 6) performed by the print processor 205 according to the fifth embodiment has been described.

Post-combination raster data in the present embodiment is substantially the same as that in the fourth embodiment except that information regarding not a medium but ink is used to make a determination. Thus, when ink that is less likely to bleed is used, post-combination raster data is obtained using a small halftone-process repeating unit. When ink that is likely to bleed is used, post-combination raster data is obtained using a large halftone-process repeating unit.

Generally, dye ink is soaked into paper fiber, and then color is developed. Thus, there may be a case where the halftone-process repeating unit does not have to be reduced. In contrast, solid particles of pigment ink are fixed to the surface of a medium, and then color is developed. Thus, a high-definition print result is obtained. In this case, an additional drawing repeating pattern can be made small.

As described above, according to the present embodiment, in addition to the effects described in the first embodiment and the second embodiment, additional drawing printing can be performed in which a halftone process using an appropriate repeating unit in terms of print quality or print speed is performed in accordance with the characteristics of ink.

Moreover, a color material in the present disclosure is not limited to ink, and other color materials such as toner are also applicable.

For example, in a case where the printer driver 206 is a common driver among models, the printer driver may be configured to change the halftone-process repeating unit in accordance with whether the color material is ink or toner.

The size of an appropriate halftone process repeating unit depends on the viscoelasticity and other properties of toner when the toner is fixed to media. Thus, the printer driver may also be configured to change the halftone-process repeating unit in accordance with the type of toner.

Moreover, the fourth embodiment and the fifth embodiment may be combined, and whether bleeding is less likely to occur may be determined in accordance with a combination of a set medium and a color material (a printing agent).

Sixth Embodiment

In the second to fifth embodiments, methods are used in which a halftone process is performed on an additional drawing, and a transparency effect is obtained. Note that when a halftone process is performed, for example, in a case where an additional drawing is drawn on a white background, the white background appears in a see-through manner, so that the color of the additional drawing appears lighter. In a case where text is drawn through additional drawing processing, the text may be allowed to appear in lighter color; however, in a case where an image is drawn through additional drawing processing, it may be undesirable that the image appear in lighter color. In an example, in a case where an image of a logo mark is to be printed through additional drawing processing, there is a demand to print the logo mark without causing its color to appear lighter in terms of the design of the logo mark. In a case where while meeting such a demand, a region of the additional drawing where the additional drawing and the drawing content issued by the application 204 overlap is desired to be transparent, transparency processing can be performed using a Boolean AND operation as illustrated in the first embodiment only in cases where images are drawn through additional drawing processing.

Thus, in the present embodiment, an embodiment will be described in which transparency processing is performed using a Boolean AND operation in a case where an image is drawn through additional drawing processing, and transparency processing is performed using a halftone process in a case where text is drawn through additional drawing processing. Note that the present embodiment is substantially the same as the first embodiment unless otherwise stated.

Figure 21:
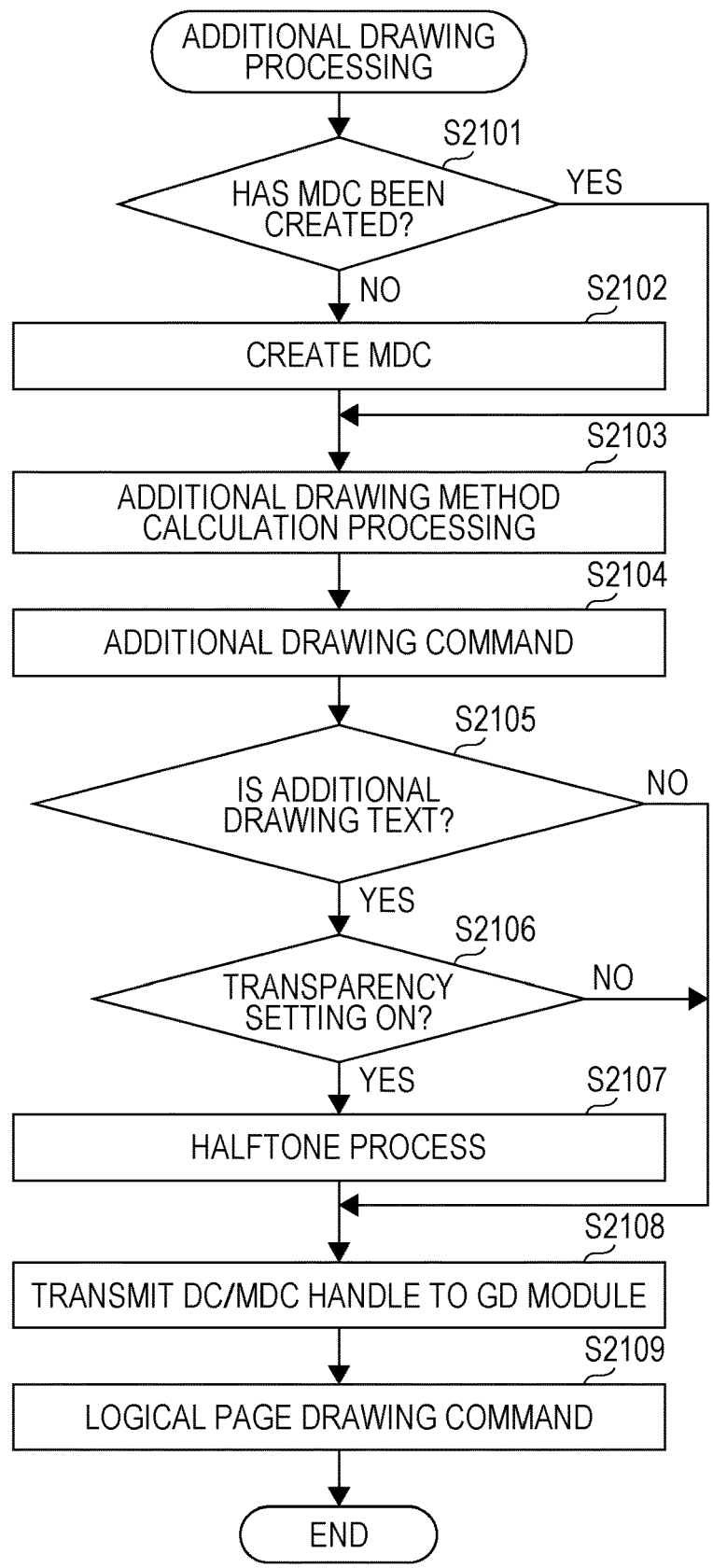
FIG. 21 is a flow chart illustrating additional drawing processing according to a sixth embodiment.

FIG. 21 is a flow chart illustrating an example of operations in the additional drawing processing (S608 in FIG. 6) performed by the print processor 205 according to a sixth embodiment.

Processing from S2101 to S2104 is substantially the same as that from S1201 to S1204 according to the second embodiment.

In S2105, the print processor 205 determines whether or not an additional drawing is text. This determination may be made by referring to "type" in the additional drawing setting information. In a case where an additional drawing is text (when YES in S2105), the print processor 205 causes the process to proceed to S2106. In contrast, in a case where an additional drawing is an image (when NO in S2105), the print processor 205 causes the process to proceed to S2108.

Processing from S2106 to S2109 is substantially the same as that from S1205 to S1208 according to the second embodiment.

In the above, an example of the operations in the additional drawing processing (S608 in FIG. 6) performed by the print processor 205 according to the sixth embodiment has been described.

Figure 22:
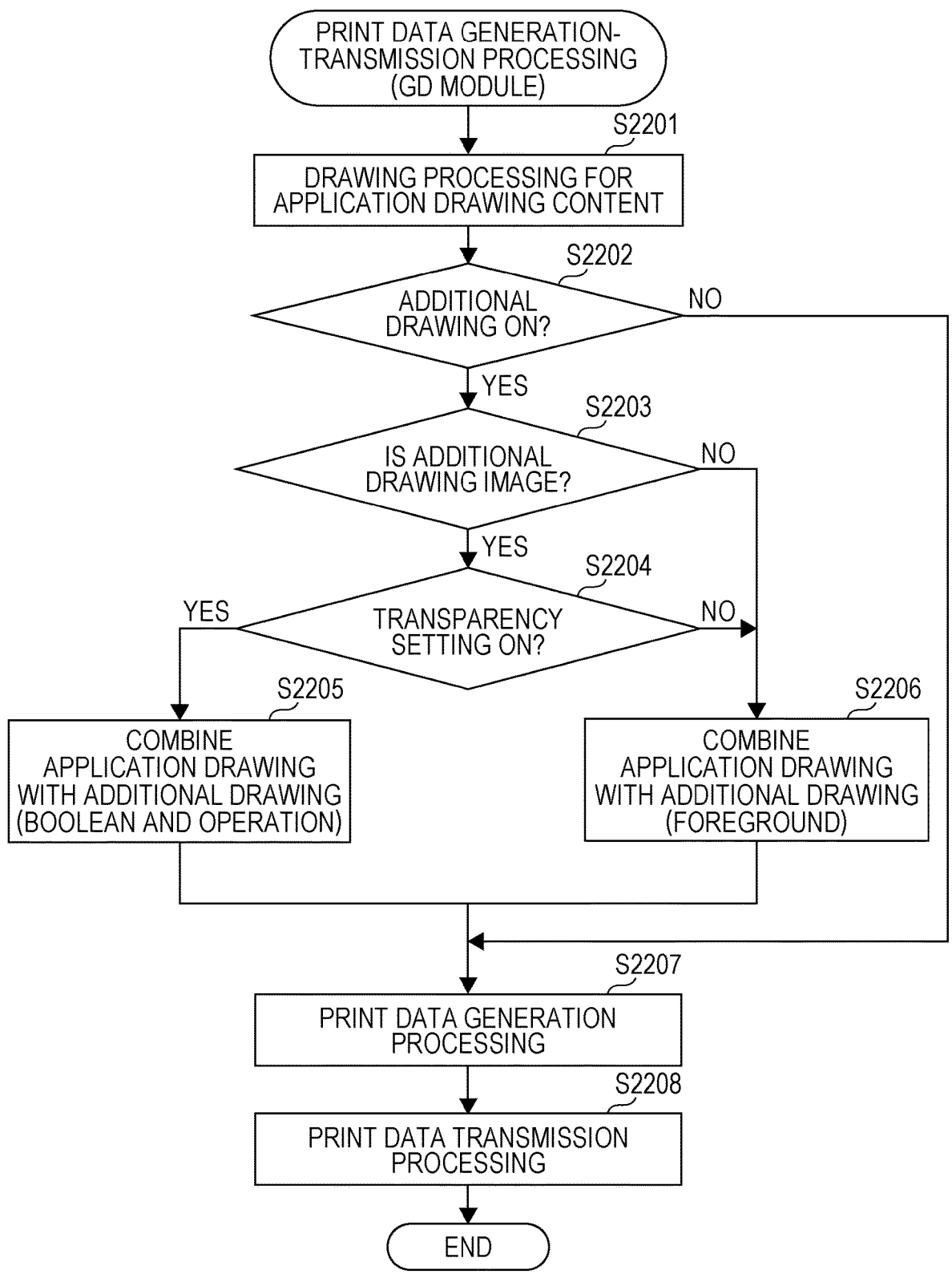
FIG. 22 is a flow chart illustrating print data generation-transmission processing according to the sixth embodiment.

FIG. 22 is a flow chart illustrating an example of operations in the print data generation-transmission processing (S612 in FIG. 6) performed by the GD module 208 according to the sixth embodiment.

Processing in S2201 and S2202 is substantially the same as that in S801 and S802 according to the first embodiment.

In S2203, the GD module 208 determines whether or not an additional drawing is an image. In a case where an additional drawing is an image (when YES in S2203), the GD module 208 causes the process to proceed to S2204. In contrast, in a case where an additional drawing is text (when NO in S2203), the GD module 208 causes the process to proceed to S2206.

Processing from S2204 to S2208 is substantially the same as that from S803 to S807 according to the first embodiment.

In the above, an example of the operations in the print data generation-transmission processing (S612 in FIG. 6) performed by the GD module 208 according to the sixth embodiment has been described.

FIGS. 23A to 23E include diagrams schematically illustrating examples of post-combination raster data according to the sixth embodiment.

Figure 23A:
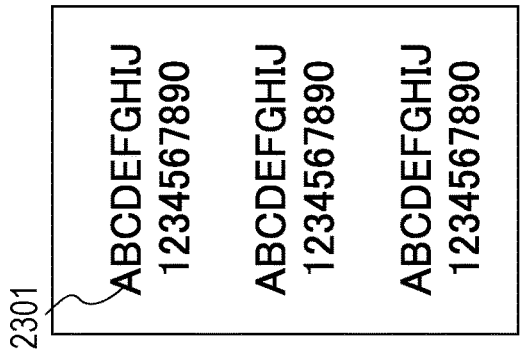
FIGS. 23A to 23E include diagrams schematically illustrating examples of post-combination raster data according to the sixth embodiment.

Suppose that post-combination raster data as in FIG. 23A is obtained in a case where the additional drawing setting is OFF. In FIG. 23A, 2301 denotes a drawing result of the drawing content issued by the application 204.

Figure 23B:
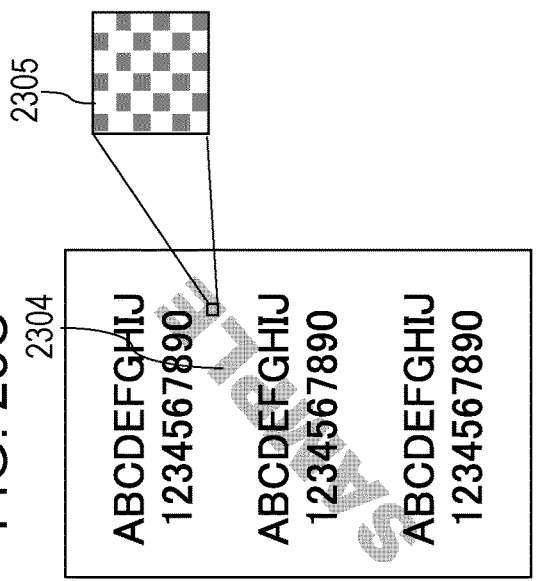

In this case, when the additional drawing setting is ON and the transparency setting is OFF, in a case where text is to be drawn through additional drawing processing, post-combination raster data as in FIG. 23B is obtained. In FIG. 23B, 2302 denotes a drawing result of an additional drawing drawn in the foreground. 2303 denotes a region of 18 pixels×18 pixels that is obtained by enlarging the drawing result of the additional drawing. In the present embodiment, when the transparency setting is OFF, the additional drawing is expressed in a single solid color as denoted by 2303.

Figure 23C:
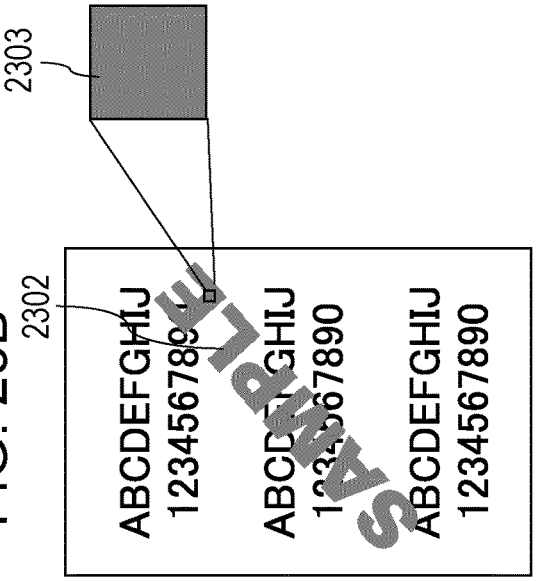

Moreover, when the additional drawing setting is ON and the transparency setting is ON, in a case where text is to be drawn through additional drawing processing, post-combination raster data as in FIG. 23C is obtained. In FIG. 23C, 2304 denotes a drawing result of an additional drawing that is subjected to a halftone process and then drawn in the foreground.

2305 denotes a region of 18 pixels×18 pixels that is obtained by enlarging the drawing result of the additional drawing.

Figure 23D:
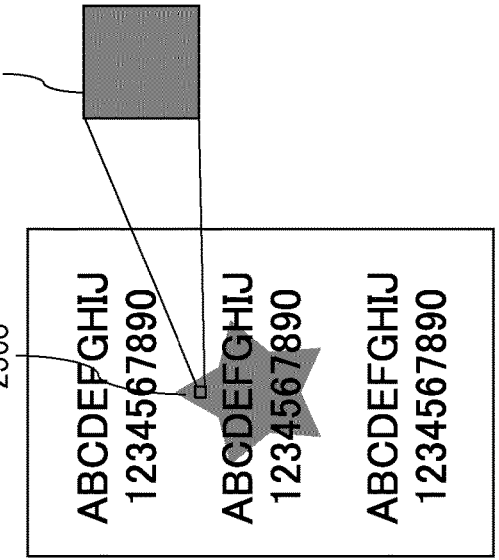

Moreover, when the additional drawing setting is ON and the transparency setting is OFF, in a case where an image is to be drawn through additional drawing processing, post-combination raster data as in FIG. 23D is obtained.

Figure 23E:
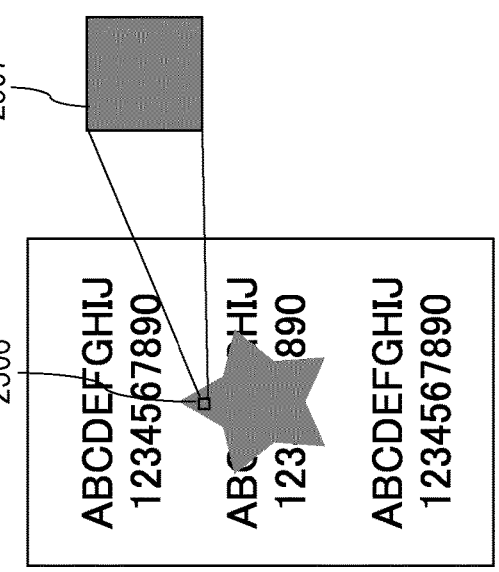

Moreover, when the additional drawing setting is ON and the transparency setting is ON, in a case where an image is to be drawn through additional drawing processing, post-combination raster data as in FIG. 23E is obtained. 2308 and 2309 in FIG. 23E correspond to 2304 and 2305; however, 2308 and 2309 do not denote text subjected to a halftone process but denote an image synthesized using a Boolean AND operation.

As illustrated in FIGS. 23C and 23E, in a case where a halftone process is performed to perform transparency processing, the color of the additional drawing appears lighter. In a case where a Boolean AND operation is performed to perform transparency processing, the color of the additional drawing does not appear lighter. As described above, in a case where a halftone process is performed, even when text color is set to white, there is an advantage in that text can be drawn in white in a transparent manner on the drawing content issued by the application 204. For example, even in a case where white text drawn as an additional drawing on a photo is desired, printing can be performed as intended by the user. In contrast, in a case where a logo mark is desired to be printed on a document, the logo mark can be printed such that the document appears in a see-through manner without causing the color of the logo mark to appear lighter.

As described above, according to the present embodiment, in addition to the effect described in the first embodiment, appropriate additional drawing processing can be performed in accordance with whether additional drawing content represents text or an image.

Seventh Embodiment

In the second to fifth embodiments, methods are used in which a halftone process is performed on an additional drawing to provide a transparency effect. Note that in the halftone process, in a case where the transmittance of an additional drawing is desired to be adjusted, a geometric halftone pattern needs to be changed, and thus complicated processing is needed to calculate a pattern. Thus, in the present embodiment, a transparency processing method for additional drawing will be described that enables the transmittance of an additional drawing to be specified. Note that the present embodiment is substantially the same as the first embodiment unless otherwise stated.

Figure 24:
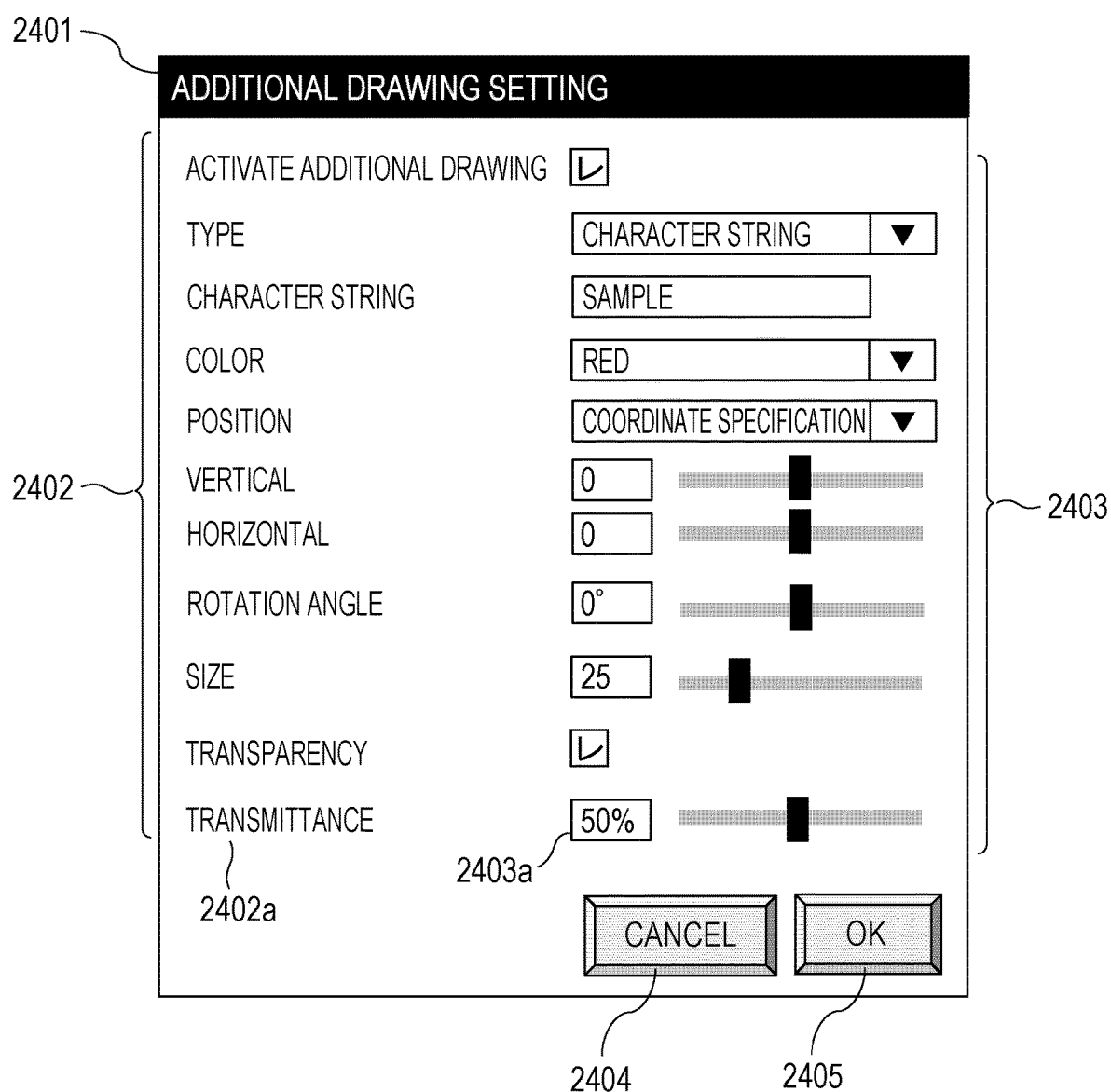
FIG. 24 is a diagram illustrating an additional drawing setting screen according to a seventh embodiment.

FIG. 24 is a diagram illustrating an example of an additional drawing setting screen displayed on the display 119 by the UI module 207 according to a seventh embodiment.

2401 to 2405 are substantially the same as 501 to 505 according to the first embodiment. Note that an additional drawing setting item 2402 includes a "transmittance" 2402a. In an input user interface 2403, "transmittance" denoted by 2403a needs to have an item that allows a desired transmittance to be selected from a plurality of discrete values or a plurality of continuous values. Examples of the item include a slider, a drop-down list, a text box, a combo box, and a radio button; however, the present disclosure is not limited to these. Moreover, the values may be numerical values; however, a mode may also be used in which a selection may be made from among characters or character strings such as "low", "medium", and "high".

Figure 25:
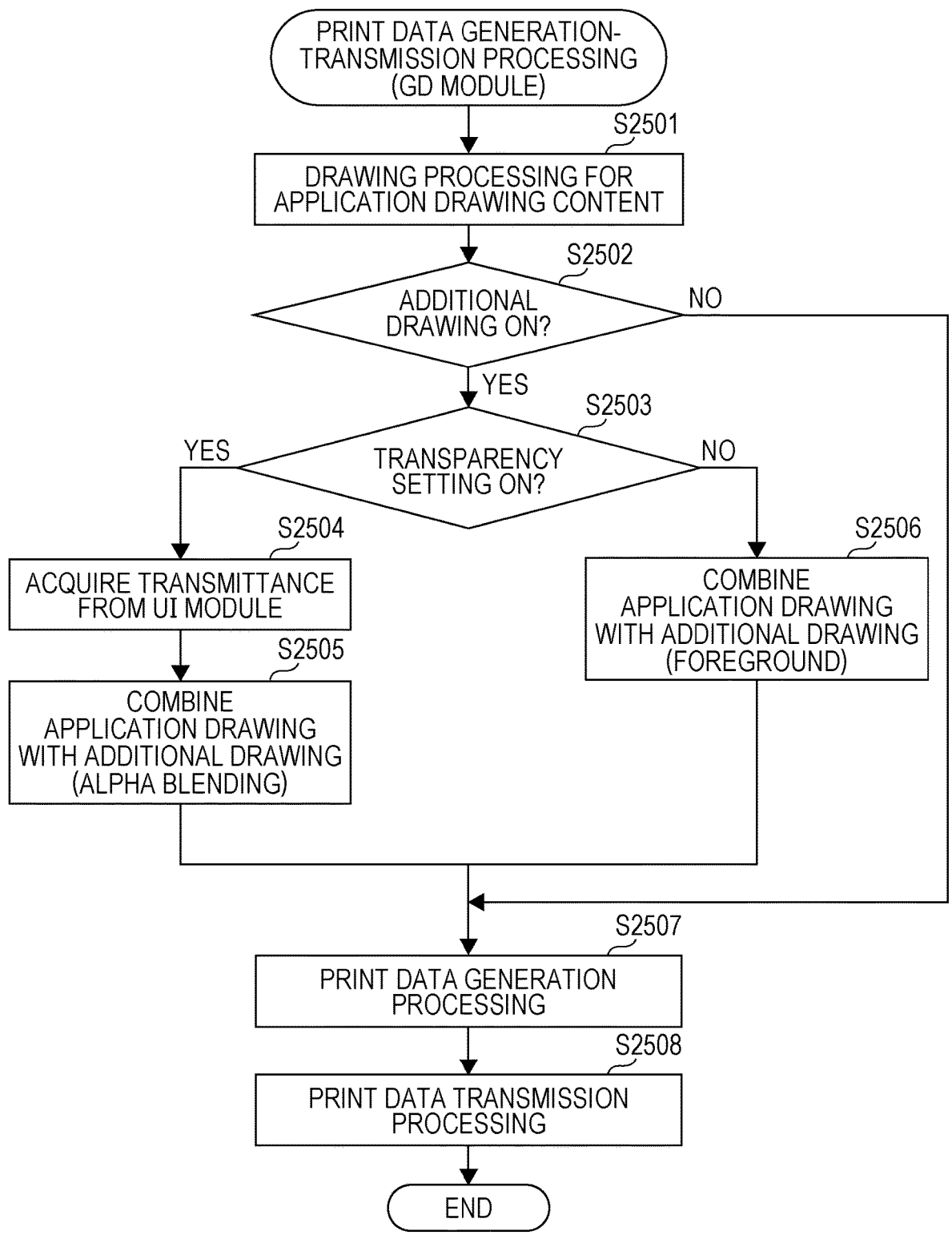
FIG. 25 is a flow chart illustrating print data generation-transmission processing according to the seventh embodiment.

FIG. 25 is a flow chart illustrating an example of operations in the print data generation-transmission processing (S612 in FIG. 6) performed by the GD module 208 according to the seventh embodiment.

Processing from S2501 to S2503 is substantially the same as that from S801 to S803 according to the first embodiment.

In S2504, the GD module 208 acquires, from the UI module 207, a value set in "transmittance" and causes the process to proceed to S2505.

In S2505, the GD module 208 combines the drawing of the drawing content issued by the application 204 with an additional drawing such that the additional drawing is disposed in front of the drawing of the drawing content issued by the application 204, and generates post-combination raster data. Thereafter, the process proceeds to S2507. In the present embodiment, a transmittance is specified for the content of the drawing region of the memory device context to combine the content of the drawing region of the memory device context with the content of the drawing region of the printer device context (alpha blending). In order to perform the combining, for example, it is sufficient that AlphaBlend, which is an API function of the GDI 202, be used, and the value of the transmittance be converted and specified when the function is called, in such a manner that drawing is performed at the above-described transmittance.

In the above, an example of the operations in the print data generation-transmission processing (S612 in FIG. 6) performed by the GD module 208 according to the seventh embodiment has been described.

Figure 26A:
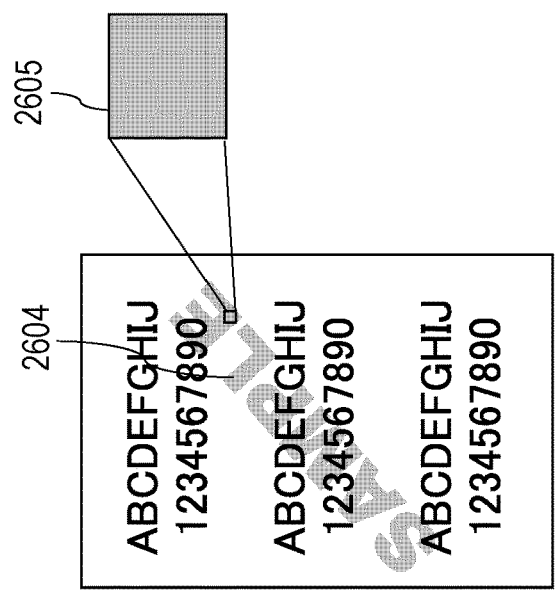
FIGS. 26A to 26C include diagrams schematically illustrating examples of post-combination raster data according to the seventh embodiment.
Figure 26B:
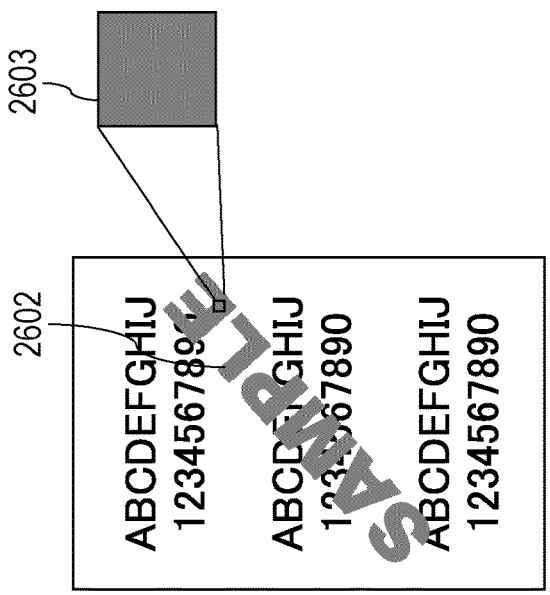
Figure 26C:
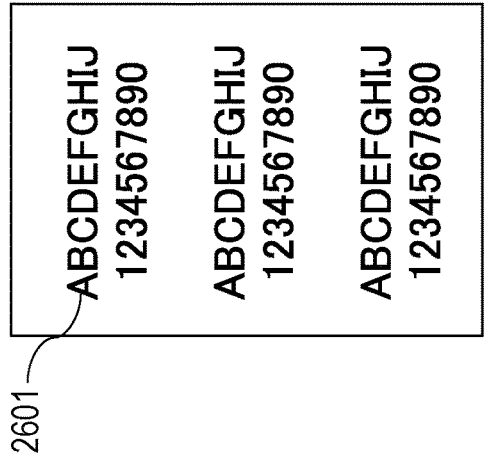

FIGS. 26A to 26C include diagrams schematically illustrating examples of post-combination raster data according to the seventh embodiment.

Suppose that post-combination raster data as in FIG. 26A is obtained in a case where the additional drawing setting is OFF. In FIG. 26A, 2601 denotes a drawing result of the drawing content issued by the application 204.

In this case, when the additional drawing setting is ON and the transparency setting is OFF, post-combination raster data as in FIG. 26B is obtained. In FIG. 26B, 2602 denotes a drawing result of an additional drawing drawn in the foreground. 2603 denotes a region of 18 pixels×18 pixels that is obtained by enlarging the drawing result of the additional drawing. In the present embodiment, when the transparency setting is OFF, the additional drawing is expressed in a single solid color as denoted by 2603.

In contrast, when the additional drawing setting is ON and the transparency setting is ON, post-combination raster data as in FIG. 26C is obtained. In FIG. 26C, 2604 denotes a drawing result obtained by performing additional drawing processing using combining processing in which a transmittance is specified. 2605 denotes a region of 18 pixels×18 pixels that is obtained by enlarging the drawing result of the additional drawing, and the region is expressed in a single solid color similarly to that denoted by 2603. Note that the degree of transparency for 2604 and 2605 is changed in accordance with a setting in "transmittance".

As described above, according to the present embodiment, in addition to the effect described in the first embodiment, additional drawing processing can be performed at any transmittance specified by the user.

Eighth Embodiment

In the present embodiment, an example in which page numbers are drawn as additional drawings will be described. Note that the present embodiment is substantially the same as the first embodiment unless otherwise stated.

Figure 27:
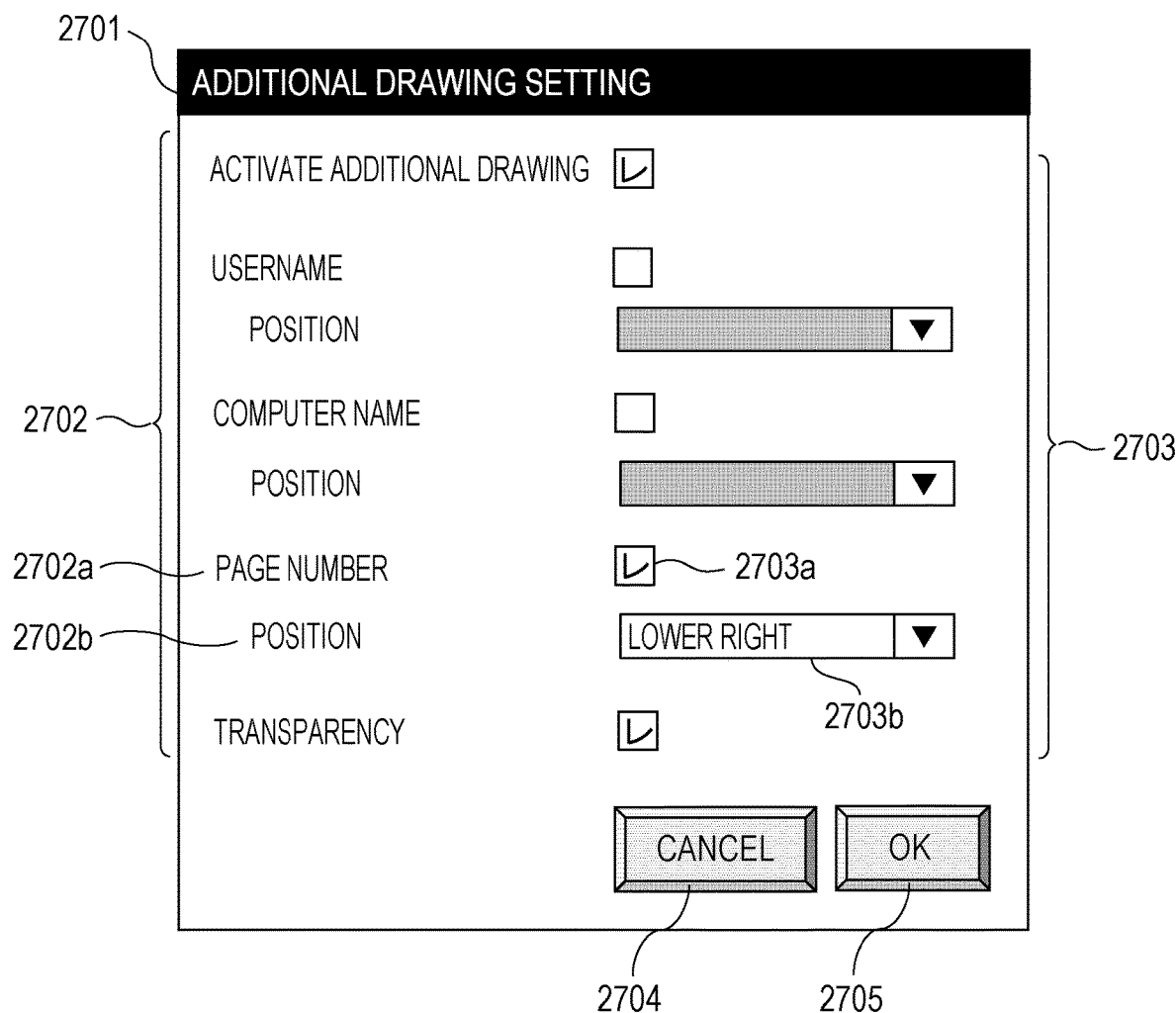
FIG. 27 is a diagram illustrating an additional drawing setting screen according to an eighth embodiment.

FIG. 27 is a diagram illustrating an example of an additional drawing setting screen displayed on the display 119 by the UI module 207 in an eighth embodiment.

2701 to 2705 are substantially the same as 501 to 505 according to the first embodiment. Note that an additional drawing setting item 2702 includes a "page number" 2702a. The "page number" 2702a can include a "position" 2702b as an additional drawing setting item belonging thereto. Portions of an input user interface 2703 corresponding to the "page number" 2702a and the "position" 2702b are denoted by 2703a and 2703b. In accordance with the setting denoted by 2703b, the position of a page number to be drawn on a logical page is determined.

Figure 28A:
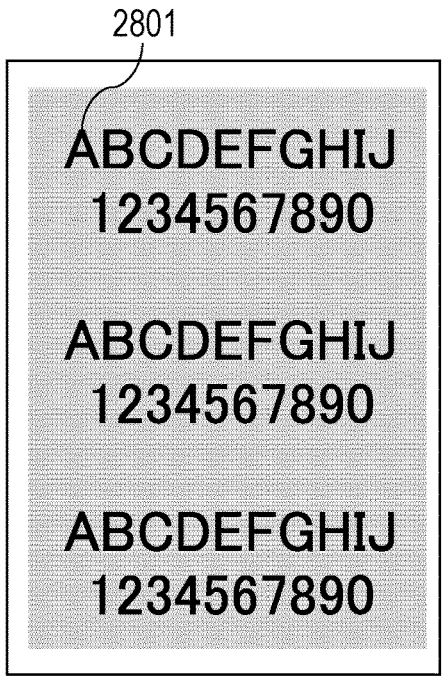
FIGS. 28A to 28D include diagrams schematically illustrating examples of post-combination raster data according to the eighth embodiment.
Figure 28B:
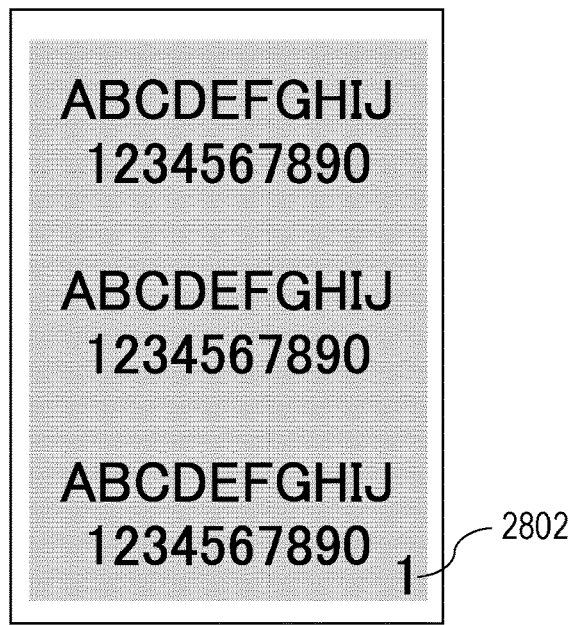

FIGS. 28A and 28B are diagrams schematically illustrating examples of post-combination raster data for a case where one spool page is allocated as a logical page to one physical page in the eighth embodiment.

Suppose that a result as in FIG. 28A is obtained in a case where the additional drawing setting is OFF. In FIG. 28A, 2801 denotes a drawing result of drawing content issued by the application 204, and suppose that the drawing content issued by the application 204 has a background color in addition to text.

In this case, when the additional drawing setting is ON and page number setting is ON, post-combination raster data as in FIG. 28B is obtained. In FIG. 28B, 2802 denotes a drawing result of the page number, and the page number is drawn in front of the drawing content issued by the application 204.

Figure 28C:
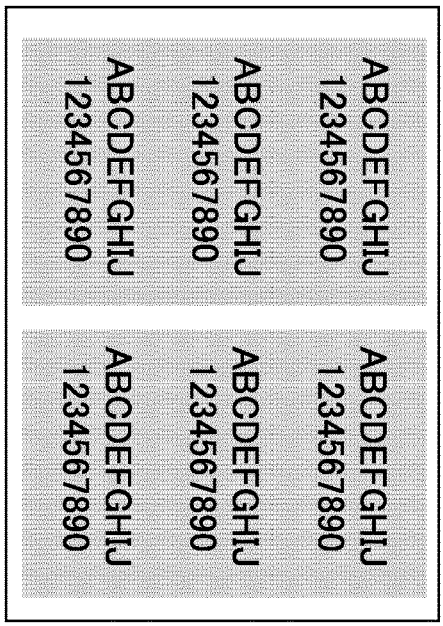
Figure 28D:
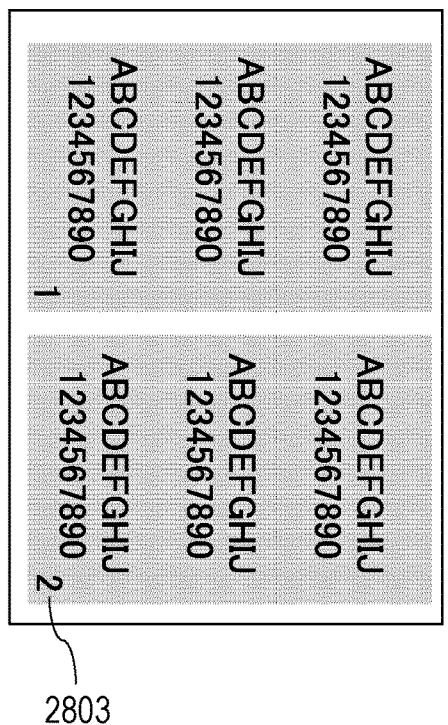

In contrast, when two spool pages having the same print settings are allocated as logical pages to one physical page, post-combination raster data as in FIG. 28C is obtained. In this case, when the additional drawing setting is ON and the page number setting is ON, post-combination raster data as in FIG. 28D is obtained. In this case, a drawing result 2803 of a page number is drawn on each logical page.

In the present embodiment, the print processor 205 performs additional drawing processing on each logical page. Since the print processor 205 is a component that allocates logical pages, the print processor 205 can draw, for each logical page, the page number corresponding to the logical page.

As described above, according to the present embodiment, in addition to the effect described in the first embodiment, an additional drawing can be drawn that includes different content on a logical page basis such as a page number.

Note that the different content is not limited to a page number in the present disclosure. More flexible additional drawing processing can be performed. For example, different contents are drawn on the front side and the back side of a medium through additional drawing processing at the time of double side printing, or the position of an additional drawing is changed on a logical page depending on the position of the logical page at the time of N-up printing.

In the above, according to each embodiment, an additional drawing having a visual effect can be drawn in front of the drawing content issued by the application, additional drawing processing is less likely to be constrained by the OS, and the OS can be notified of a correct number of pages. Thus, even in a case where the number of print pages is displayed using a function of the OS, the user may be less likely to be confused due to a displayed value different from an actual number of print pages.

Ninth Embodiment

In a case where the image data 302 generated by the user is used as data for an additional drawing, a problem as in the following may occur. That is, in a case where settings are set in Point and Print described above such that the print processor 205 or the GD module 208 performs processing on the server side (hereinafter referred to as "server side rendering"), it is difficult to transmit the image data 302 to the server side.

As a method for solving this, there is a method in which the UI module 207 inserts a spool page for an additional drawing into the spool file 301, and the print processor 205 issues a drawing command so as to overlay a normal spool page (hereinafter referred to as a "logical spool page") and the spool page for an additional drawing one on top of the other. Note that, as described above, this method cannot be performed in the splwow64 process.

In a ninth embodiment, a method for performing appropriate processing in accordance with whether or not the splwow64 process is in operation and whether the type of additional drawing is "text" or "image" will be described.

Note that the present embodiment is substantially the same as the first embodiment unless otherwise stated.

In the present embodiment, in a case where the additional drawing setting screen is opened in the splwow64 process, predetermined control is performed such that an additional drawing that is an image is not to be printed. Specifically, the predetermined control is control under which, for example, the UI module 207 removes an option for setting the type of additional drawing to "image" from the section denoted by 503 or 2703 or grays out the option, so that the option cannot be selected. Note that the predetermined control may be control under which an additional drawing that is an image is deleted and print data is generated.

Moreover, in the ninth embodiment, the item "transparency" in FIG. 5 may be replaced with an item "transparency/background". This is because when the checkbox for "transparency/background" is checked, in a case where the type of additional drawing is "text", processing substantially the same as those in the first to eighth embodiments is performed; however, in a case where the type of additional drawing is "image", processing for drawing an image in the background is performed.

Figure 29:
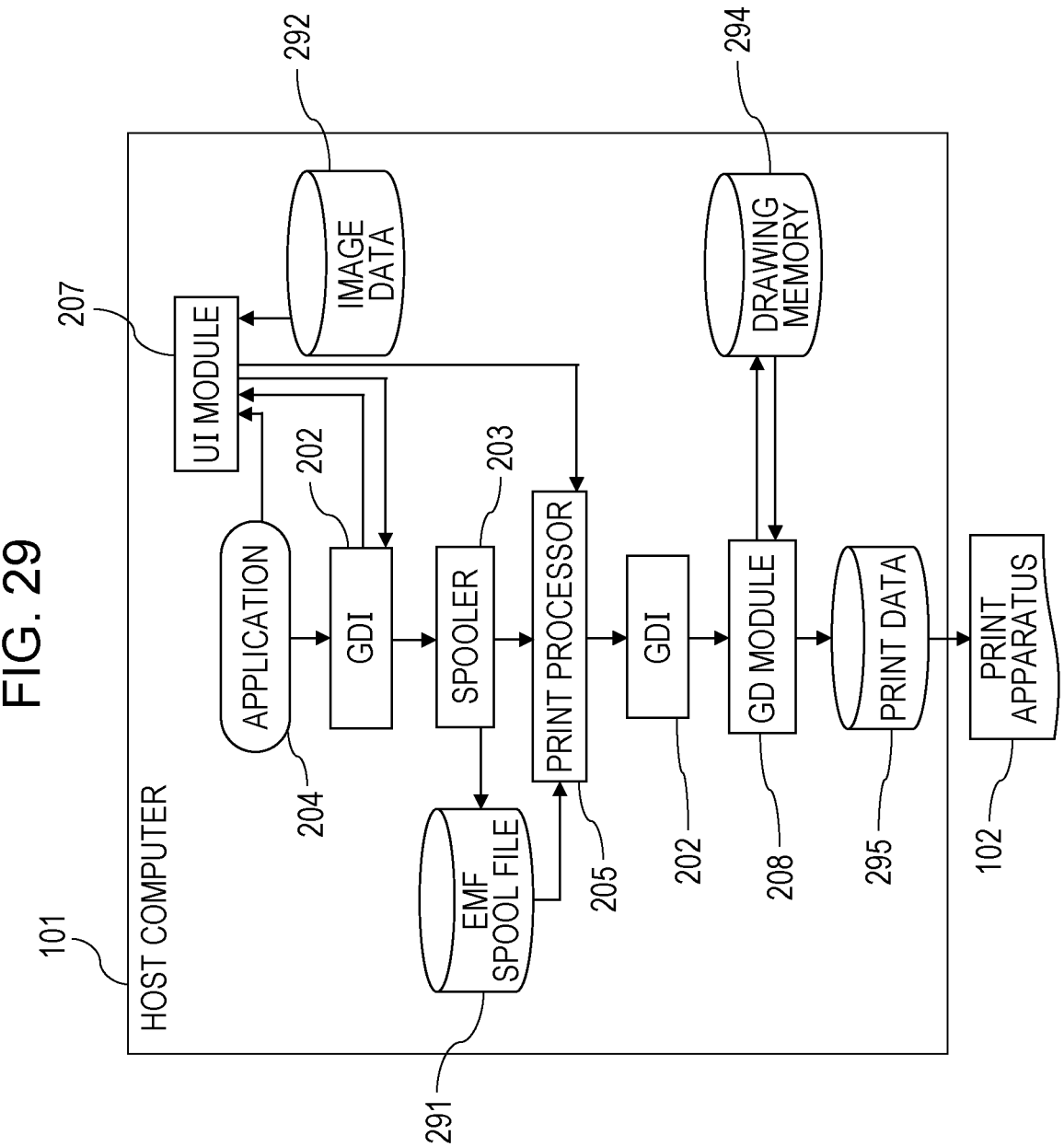
FIG. 29 is a diagram illustrating data flow according to a ninth embodiment from when a print command is issued by an application to when print data is transmitted to a print apparatus.

FIG. 29 is a diagram illustrating an example of data flow from when a print command is issued by the application 204 to when print data is transmitted to the print apparatus 102.

In the ninth embodiment, when the type of additional drawing is "text", the procedure is substantially the same as those in the first to eighth embodiments; however, when the type of additional drawing is "image", the procedure will be as follows. Note that, in the present embodiment, an additional drawing corresponding to the type of "image" is specifically, for example, an additional drawing in a bitmap format.

First, the application 204 calls the UI module 207 to generate print settings. In order to generate print settings, the UI module 207 displays a print setting screen on the display 119. The user may input, using the pointing device 117 or the keyboard 118, setting information necessary for performing additional drawing processing (hereinafter referred to as "additional drawing setting information").

When the user causes the application 204 to issue a print command, the application 204 passes the print settings and drawing data to the GDI 202.

Upon receiving the print settings and drawing data from the application 204, the GDI 202 stores, in an EMF spool file 291, a document spool page including the print settings and drawing information via the spooler 203. This drawing information is the drawing content issued by the application 204.

In this case, furthermore, the GDI 202 transmits a print start notification to the UI module 207. Upon receiving the print start notification, the UI module 207 performs spool page insertion processing. Details of the spool page insertion processing will be described later. In this processing, the UI module 207 loads image data 292. The image data 292 is generated, for example, as an image file on the host computer 101. Moreover, the UI module 207 issues an additional drawing command to the GDI 202 in the spool page insertion processing. As a result, an additional spool page including the print settings and information regarding the additional drawing command (additional drawing information) is inserted into the EMF spool file 291.

Once the print settings and drawing information have been stored in the EMF spool file 291, the spooler 203 loads the print processor 205.

The print processor 205 acquires additional drawing setting information for additional drawing processing from the UI module 207.

The print processor 205 determines, from the above-described additional drawing setting information, whether an additional drawing is to be drawn in front of or behind the drawing issued by the application.

Thereafter, by calling an API function of the GDI 202, the print processor 205 commands the GD module 208 to draw the logical spool page and the additional spool page included in the EMF spool file 291.

In this case, in a case where the additional drawing is drawn in front of the drawing issued by the application, the print processor 205 calls an API function so that the logical spool page is drawn first, and the additional spool page is drawn thereafter. Note that in a case where the additional drawing is drawn behind the drawing issued by the application, the print processor 205 calls an API function so that the additional spool page is drawn first, and the logical spool page is drawn thereafter.

The GD module 208 performs drawing in a drawing memory 294 on the basis of the drawing command received from the GDI 202. What is drawn in this case is both the drawing content issued by the application 204 and the additional drawing. Thereafter, the GD module 208 generates, on the basis of the drawing result in the drawing memory 294, print data 295 that can be read by the print apparatus 102, and transmits the print data 295 to the print apparatus 102.

Figure 30:
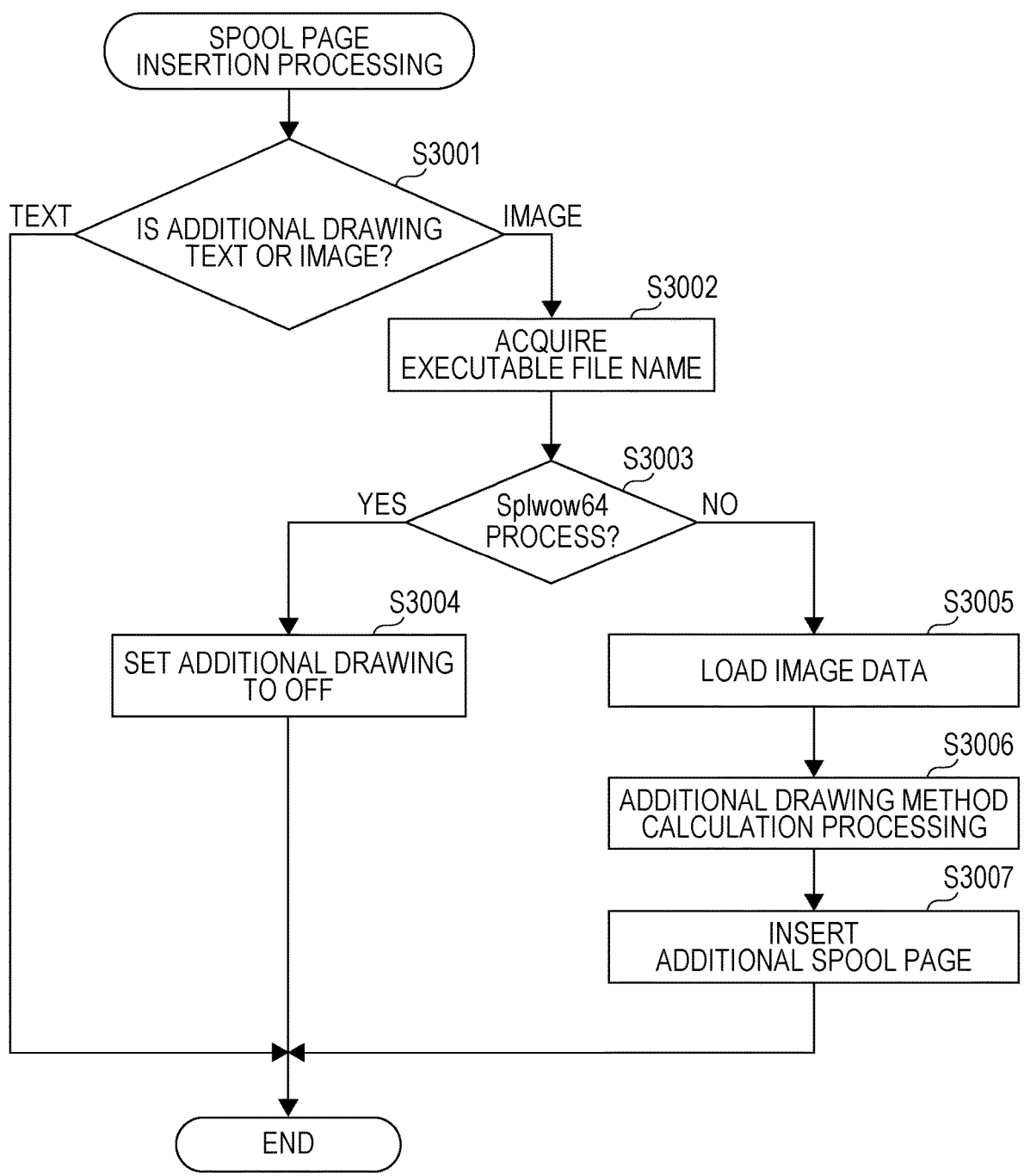
FIG. 30 is a flow chart illustrating spool page insertion processing according to the ninth embodiment.

FIG. 30 is a flow chart illustrating an example of the procedure of spool page insertion processing performed by the UI module 207.

In S3001, the UI module 207 determines, from the additional drawing setting information, whether the type of additional drawing is "text" or "image". In a case where the type of additional drawing is "text", processing for this flow chart ends. In a case where the type of additional drawing is "image", the process proceeds to S3002.

In S3002, the UI module 207 acquires an executable file name and causes the process to proceed to S3003.

In S3003, the UI module 207 determines whether the UI module 207 is executed in the splwow64 process. That is, it is determined, from the executable file name acquired in S3002 described above, whether the executable file is splwow64. In a case where the UI module 207 is executed in the splwow64 process (when YES in S3003), the process proceeds to S3004. In a case where the UI module 207 is not executed in the splwow64 process (when NO in S3003), the process proceeds to S3005.

In S3004, the UI module 207 sets additional drawing to OFF and ends processing for this flow chart. Specifically, setting the additional drawing to OFF corresponds to performing control such that the additional drawing is deleted and print data is generated without performing additional drawing processing. Note that, as described above, in a case where the UI module 207 is executed in the splwow64 process, predetermined control is performed to prevent "image" from being selected as the type of additional drawing. Thus, normally, YES is not obtained as a determination in S3003. However, depending on conditions under which the UI module 207 is started up, there may be a case where a process for executing the UI module 207 is not determined when the UI module 207 is started up. Thus, after "image" is selected as the type of additional drawing on the additional drawing setting screen, the splwow64 process may be determined as a process for executing the UI module 207. In such a case, YES is obtained as a determination in S3003, and processing in S3004 is performed.

In S3005, the UI module 207 loads the image data 292 and causes the process to proceed to S3006.

In S3006, the UI module 207 performs additional drawing method calculation processing using the loaded image data 292, the additional drawing setting information, or the like. In the additional drawing method calculation processing, coordinates, the size, and the like of an additional drawing is calculated. Thereafter, the process proceeds to S3007.

In S3007, the UI module 207 calls the API of the GDI 202 on the basis of the calculation result obtained in S3006, so that an additional spool page is inserted (drawn). Thereafter, processing for this flow chart ends.

The operations in page drawing processing performed by the print processor 205 according to the ninth embodiment can be performed using the method illustrated in the flow chart in FIG. 6 except for some of the operations. Note that the additional drawing processing in S608 and the print data generation-transmission processing in S612 are performed as follows.

In this case, additional drawing processing (S608) according to the present embodiment will be described.

Figure 31:
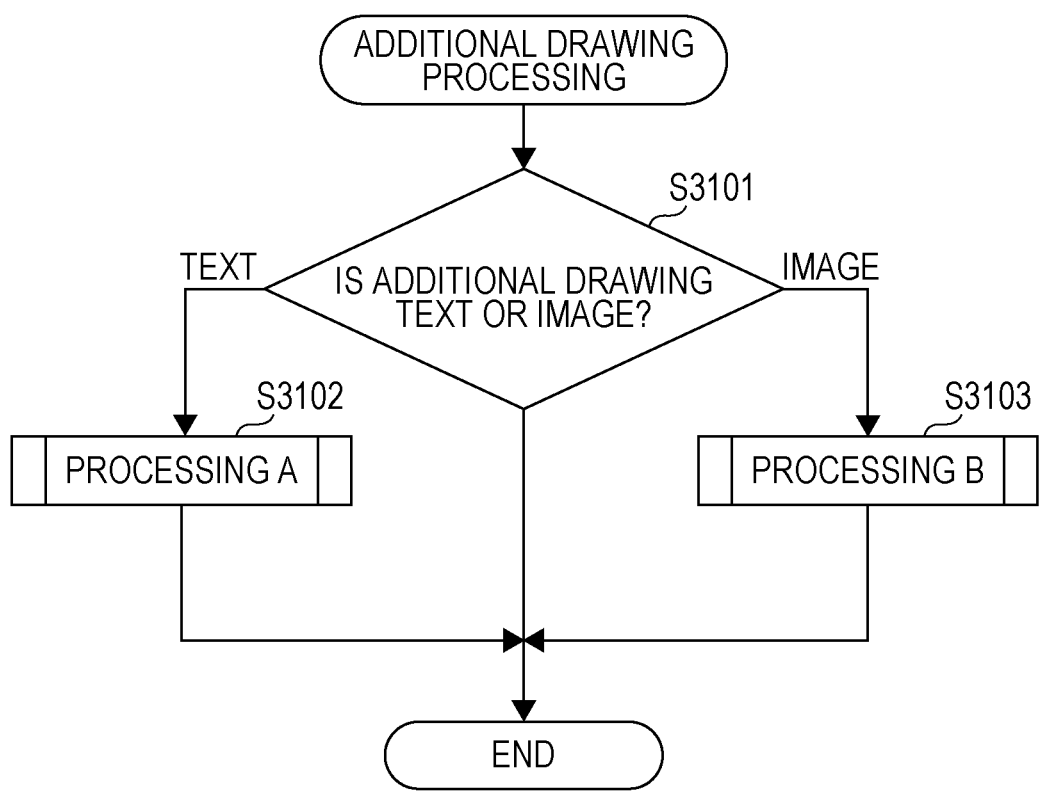
FIG. 31 is a flow chart illustrating an example of operations in additional drawing processing according to the ninth embodiment.

FIG. 31 is a flow chart illustrating an example of operations in the additional drawing processing according to the ninth embodiment.

In S3101, the print processor 205 determines whether the type of additional drawing is "text" or "image" from the additional drawing setting information acquired in S606. In a case where the type of additional drawing is "text", the print processor 205 performs processing A (S3102) and ends processing for this flow chart. In the processing A, additional drawing processing described in any one of the first to eighth embodiments is performed. That is, in a case where the type of additional drawing is "text", regardless of whether the UI module 207 is executed in the splwow64 process or not, the processing A is performed. Note that the present disclosure is not limited to this. Even in a case where the type of additional drawing is "text", processing B, which will be described later, may be performed. In contrast, in a case where the type of additional drawing is "image", the processing B is performed (S3103), and processing for this flow chart ends. The processing B is additional drawing processing unique to the present embodiment, and details thereof will be described later. That is, in a case where the type of additional drawing is "image", and the UI module 207 is executed in a process other than the splwow64 process, the processing B is performed.

In a case where the type of additional drawing is "image", and the UI module 207 is executed in the splwow64 process, additional drawing processing itself is not performed (neither the processing A nor the processing B is performed).

Figure 32:
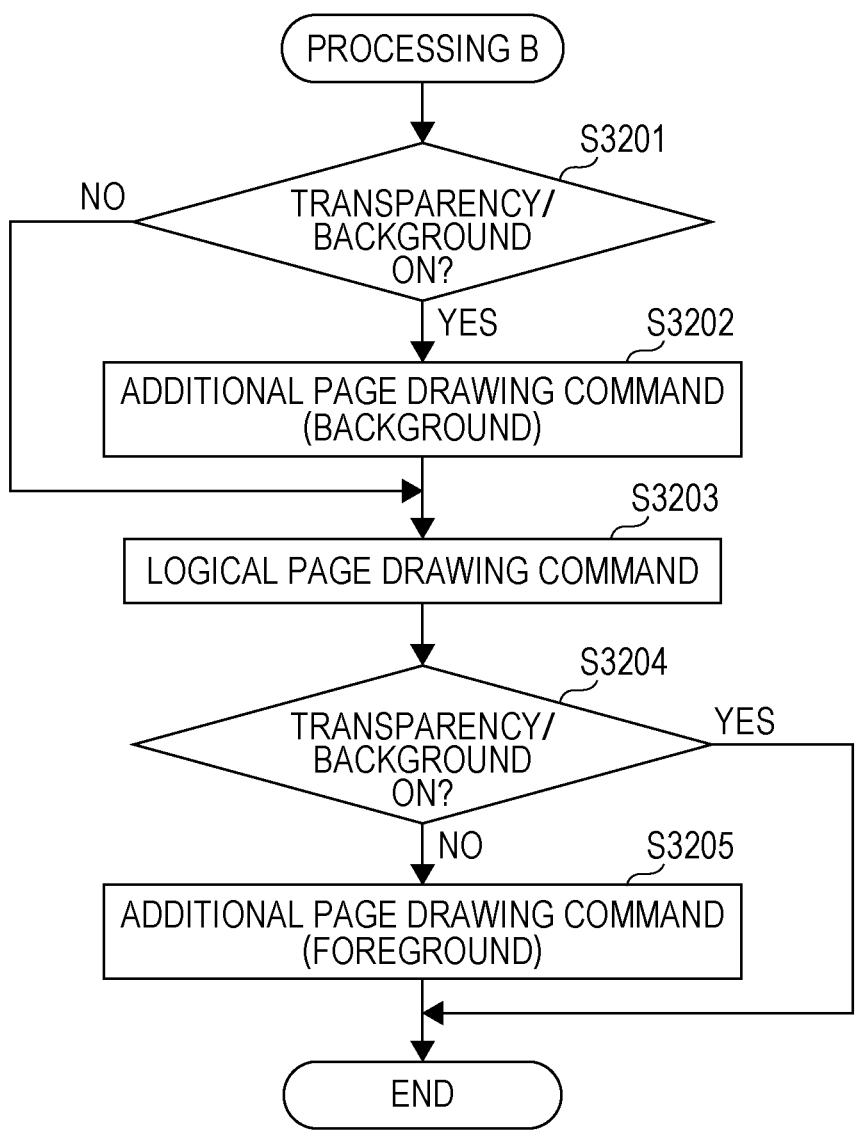
FIG. 32 is a flow chart illustrating operations in part of the additional drawing processing according to the ninth embodiment.

FIG. 32 is a flow chart illustrating an example of operations in the processing B (part of the additional drawing processing according to the ninth embodiment).

In S3201, the print processor 205 determines whether "transparency/background" is ON or not from the additional drawing setting information. In a case where "transparency/background" is not ON (when NO in S3201), the process proceeds to S3203. In a case where "transparency/background" is ON (when YES in S3201), the process proceeds to S3202.

In S3202, the print processor 205 issues an additional page drawing command to the GDI 202. This is a drawing command for an additional spool page inserted by the UI module 207, and the additional spool page is drawn in the background of a logical page. Thereafter, the process proceeds to S3203.

In S3203, the print processor 205 issues a logical page drawing command to the GDI 202. Thereafter, the process proceeds to S3204.

In S3204, the print processor 205 determines whether "transparency/background" is ON or not from the additional drawing setting information. In a case where "transparency/background" is not ON (when NO in S3204), the process proceeds to S3205. In a case where "transparency/background" is ON (when YES in S3204), processing for this flow chart ends.

In S3205, the print processor 205 issues an additional page drawing command to the GDI 202. This is a drawing command for the additional spool page inserted by the UI module 207, and the additional spool page is drawn in the foreground of the logical page. Thereafter, processing for this flow chart ends.

Figure 33:
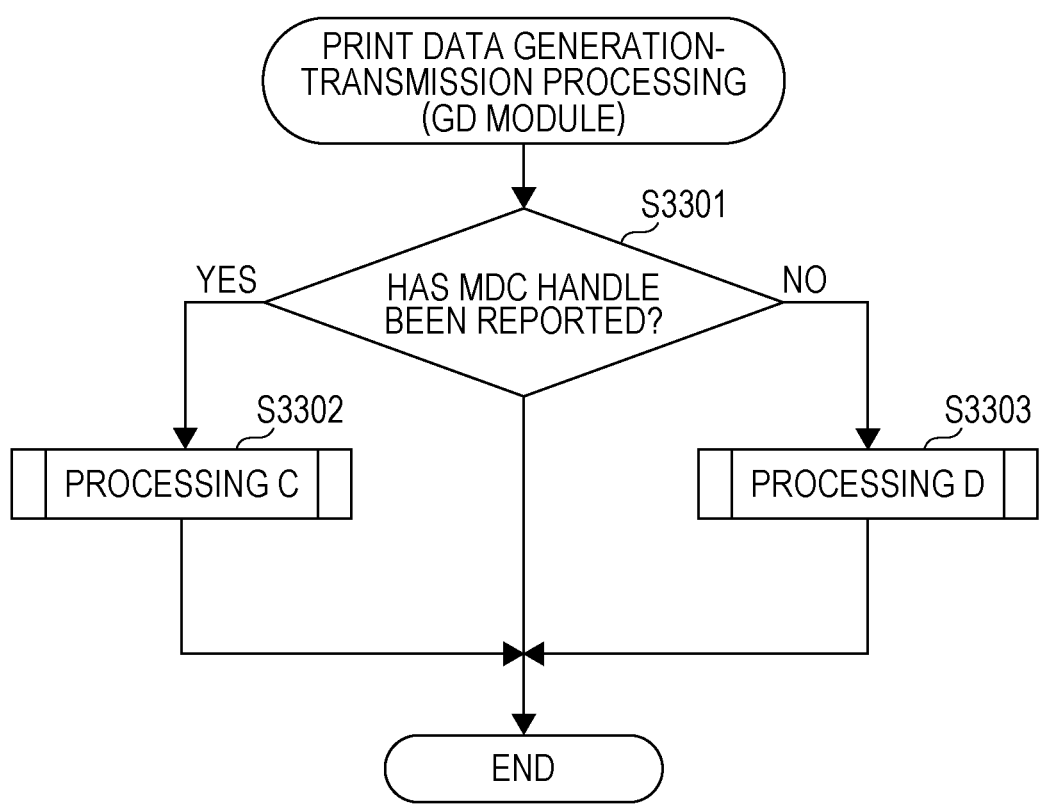
FIG. 33 is a flow chart illustrating print data generation-transmission processing according to the ninth embodiment.

FIG. 33 is a flow chart illustrating an example of operations in the print data generation-transmission processing (S612) performed by the GD module 208 according to the ninth embodiment.

In S3301, the GD module 208 determines whether a memory device context handle has been reported or not. Note that, in the ninth embodiment, in a case where additional drawing is ON and the type of additional drawing is "text", a memory device context handle has been reported. In this case, in a case where a memory device context handle has been reported, the GD module 208 performs processing C (S3302). In the processing C, print data generation-transmission processing is performed using any one of the methods described in the first to eighth embodiments, and processing for this flow chart ends.

In contrast, in a case where it is determined in S3301 that a memory device context handle has not been reported, the GD module 208 performs processing D (S3303), and thereafter processing for this flow chart ends. The processing D is print data generation-transmission processing unique to the present embodiment, and details thereof will be described later.

Figure 34:
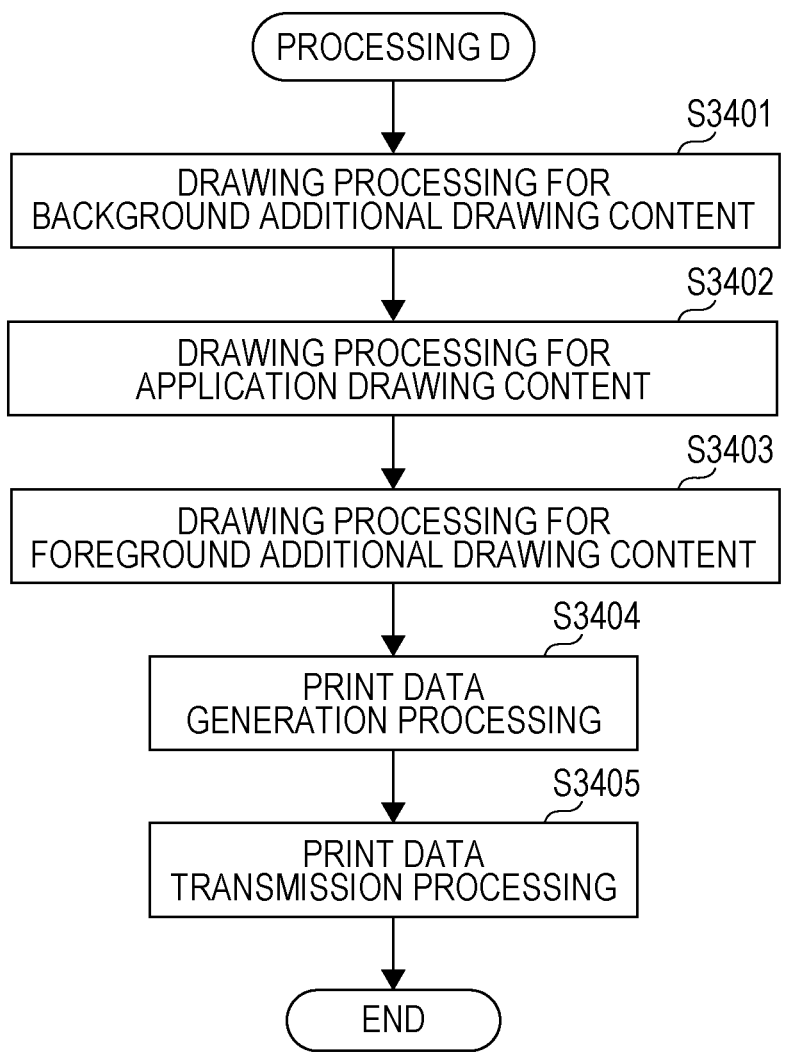
FIG. 34 is a flow chart illustrating operations in part of the print data generation-transmission processing according to the ninth embodiment.

FIG. 34 is a flow chart illustrating an example of operations in the processing D according to the ninth embodiment (part of the print data generation-transmission processing according to the ninth embodiment).

In S3401 to S3403, the GD module 208 performs drawing processing for background additional drawing content, application drawing content, and foreground additional drawing content in this order. Note that the background additional drawing content is drawing content based on the additional page drawing command in S3202 in the processing B, and the foreground additional drawing content is drawing content based on the additional page drawing command in S3205 in the processing B. As a result, the GD module 208 generates raster data by synthesizing the additional drawing content in front of or behind the application drawing content.

In S3404, the GD module 208 performs print data generation processing on the basis of the raster data generated in S3401 to S3403.

In S3405, the GD module 208 performs print data transmission processing for transmitting the print data generated in S3404 to the print apparatus.

FIG. 35 is a sequence diagram illustrating an example of operations in page drawing processing performed by the UI module 207, the print processor 205, the GDI 202, and the GD module 208 at the time of performing additional drawing processing. Note that processes in S3501, S3502, S3504, S3506, S3507, and S3508 are substantially the same as processes in S401, S402, S407, S408, S409, and S410 illustrated in FIG. 4.

In S3503 and 53505, the print processor 205 issues an additional page drawing command (GdiPlayPageEMF) to the GDI 202. These processes are performed in substantially the same manner as the process in S3504 except that the GDI 202 is commanded to draw, instead of a logical spool page, an additional spool page inserted by the UI module 207.

Note that an additional spool page for which a drawing command is issued in S3503 corresponds to a back surface of a logical spool page for which a drawing command is issued in S3504. In contrast, a spool page for which a drawing command is issued in 53505 corresponds to a front surface of the logical spool page for which a drawing command issued in S3504.

Moreover, S3503, S3504, and 53505 are processes corresponding to S3202, S3203, and S3205 in FIG. 32.

Figure 36A:
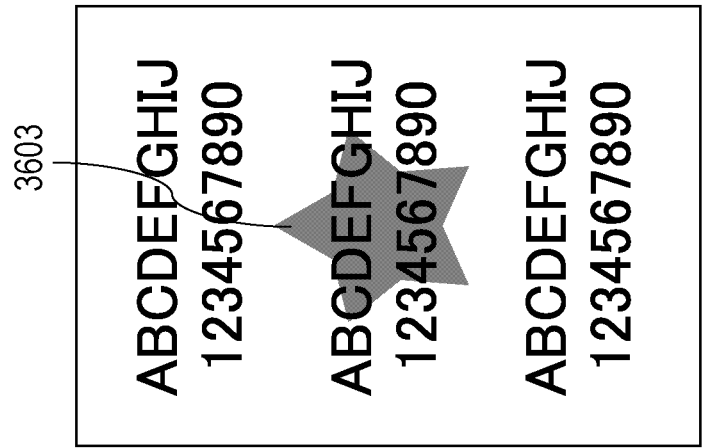
FIGS. 36A to 36C include diagrams schematically illustrating examples of raster data according to the ninth embodiment.
Figure 36B:
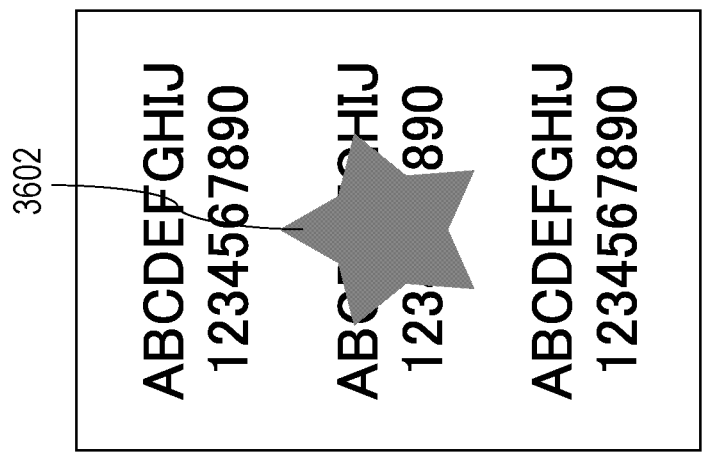
Figure 36C:
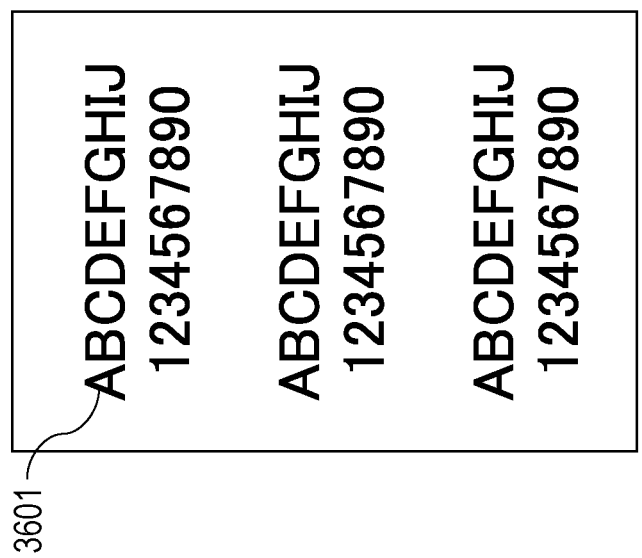

FIGS. 36A to 36C include diagrams schematically illustrating examples of raster data according to the ninth embodiment.

Suppose that a result as in FIG. 36A is obtained in a case where the additional drawing setting is OFF. In FIG. 36A, 3601 denotes a drawing result of the drawing content issued by the application 204.

In this case, when the additional drawing setting is ON, the type of additional drawing is "image", and transparency/background setting is OFF, raster data as in FIG. 36B is obtained. In FIG. 36B, 3602 denotes a drawing result of an additional drawing drawn in front of the drawing content issued by the application 204.

In contrast, when the additional drawing setting is ON, the type of additional drawing is "image", and the transparency/background setting is ON, raster data as in FIG. 36C is obtained. In FIG. 36C, 3603 denotes a drawing result of an additional drawing drawn behind the drawing content issued by the application 204.

Note that when the type of additional drawing is "text", a result as described in any one of the first to eighth embodiments is obtained.

In this manner, in the ninth embodiment, appropriate processing can be performed in accordance with the OS or the state of the application, and the number of situations in which additional drawing processing cannot be performed can be reduced.

In the above, according to each embodiment, print data for performing additional drawing processing in front of the drawing content issued by the application can be appropriately generated.

Note that the configuration of each type of data described above and its content are not limited thereto. As a matter of course, each type of data described above and its content may have various configurations in accordance with applications and purposes.

In the above, embodiments have been described. The present disclosure can be realized, for example, in the form of a system, an apparatus, a method, a program, or a storage medium. Specifically, the present disclosure may be applied to a system constituted by a plurality of devices or to an apparatus constituted by one device.

Moreover, all the configurations obtained by combining the above-described embodiments are included in the present disclosure.

Other Embodiments

The present disclosure can also be realized through processing performed by reading out and executing a program that realizes at least one of the functions of the above-described embodiments using at least one processor of a computer of a system or device, the program having been supplied to the system or device via a network or a storage medium. In addition, the present disclosure can also be realized by a circuit (for example, an application specific integrated circuit (ASIC)) that realizes the at least one of the functions.

Moreover, the present disclosure may be applied to a system constituted by a plurality of devices or to an apparatus constituted by one device.

The present disclosure is not limited to the above-described embodiments, and various deformations (including organic combinations of the embodiments) are possible on the basis of the gist of the present disclosure, and these deformations are not excluded from the scope of the present disclosure. That is, all the configurations obtained by combining the above-described embodiments and their modifications are included in the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-109238, filed Jul. 6, 2022, which is hereby incorporated by reference herein in its entirety.

What is claimed is:

1. A control method for an information processing apparatus including a print processor, an operating system (OS) and a printer driver, the information processing apparatus being configured to generate print data using the print processor and the printer driver, the print processor being configured to calculate allocation of a logical page to a physical page, the logical page being included in a spool file that stores drawing information regarding one or more logical pages generated by an application, the printer driver being configured to generate, using a result of the calculation, first raster data based on drawing information regarding the one or more logical pages in a drawing region for printing, the method comprising:
performing an additional drawing process in which the print processor generates, in a drawing region different from the drawing region for printing, second raster data for drawing an additional drawing in addition to the drawing information regarding the one or more logical pages;
performing, in a case where the additional drawing is an image, generation of print data for drawing the additional drawing or generation of print data with which the additional drawing is not drawn in accordance with whether a user interface module of the information processing apparatus operates in a splwow64 process or operates in a process other than the splwow64 process;
performing a combining process in which the printer driver combines the first raster data with the second raster data to generate third raster data; and
performing a generation process in which the printer driver generates print data based on the third raster data,
wherein a memory device context creation command is issued for the additional drawing so that the OS is not notified of the additional drawing as a print page.

2. The control method according to claim 1, wherein in the combining process, in a case where the first raster data and the second raster data are combined together, logical products of bits of color information regarding individual pixels having same coordinates are obtained to calculate individual bits of color information regarding individual post-combination pixels.

3. The control method according to claim 1, further comprising:
performing halftoning in which the print processor performs a halftone process on the second raster data.

4. The control method according to claim 3, wherein in the halftoning, a size of a halftone repeating resolution is changed based on a size of the additional drawing.

5. The control method according to claim 3, wherein in the halftoning, a size of a halftone repeating resolution is changed based on a type of medium to be used in printing.

6. The control method according to claim 3, wherein in the halftoning, a size of a halftone repeating resolution is changed based on a type of printing agent loaded in a print apparatus to be used in printing.

7. The control method according to claim 3, further comprising:
performing a compression process in which the printer driver compresses the third raster data.

8. The control method according to claim 3, wherein the halftoning is performed in a case where the additional drawing is text, and
in the combining process, in a case where the additional drawing is an image, logical products of bits of color information regarding individual pixels having same coordinates in the first raster data and the second raster data are obtained to calculate individual bits of color information regarding individual post-combination pixels.

9. The control method according to claim 1, wherein in the combining process, the first raster data and the second raster data are combined together based on information regarding a transmittance included in a print setting.

10. The control method according to claim 1, wherein in the additional drawing process, in a case where a plurality of logical pages are allocated to one physical page, the additional drawing is drawn on each logical page.

11. The control method according to claim 10, wherein a different additional drawing drawn on each logical page includes the additional drawing representing a page number.

12. The control method according to claim 1, wherein a method for generating print data for drawing the additional drawing is switched in accordance with whether the additional drawing is text or an image.

13. The control method according to claim 1, wherein in a case where the additional drawing is a character, print data for drawing the additional drawing is generated regardless of whether the user interface module of the information processing apparatus operates in a splwow64 process or operates in a process other than the splwow64 process.

14. The control method according to claim 1,
wherein in a case where the additional drawing is the image and the user interface module of the information processing apparatus operates in the splwow64 process, generation of print data with which the additional drawing is not drawn is performed, and
wherein in a case where the additional drawing is the image and the user interface module of the information processing apparatus operates in a process other than the splwow64 process, generation of print data for drawing the additional drawing is performed.

15. The control method according to claim 1, further comprising performing a control process in which in a case where the user interface module of the information processing apparatus operates in the splwow64 process, control is performed so that an option for selecting the image as a type of the additional drawing is unselectable.

16. An information processing apparatus comprising:
a print processor;
an operating system (OS); and
a printer driver,
wherein the information processing apparatus is configured to generate print data using the print processor and the printer driver, the print processor is configured to calculate allocation of a logical page to a physical page, the logical page being included in a spool file that stores drawing information regarding one or more logical pages generated by an application, and the printer driver is configured to generate, using a result of the calculation, first raster data based on drawing information regarding the one or more logical pages in a drawing region for printing, wherein the print processor includes an additional drawing unit configured to generate, in a virtual drawing region different from the drawing region for printing, second raster data for drawing an additional drawing in addition to the drawing information regarding the one or more logical pages, performing, in a case where the additional drawing is an image, generation of print data for drawing the additional drawing or generation of print data with which the additional drawing is not drawn in accordance with whether a user interface module of the information processing apparatus operates in a splwow64 process or operates in a process other than the splwow64 process;

the printer driver includes a combining unit configured to combine the first raster data with the second raster data to generate third raster data, and the printer driver includes a generation unit configured to generate print data based on the third raster data, wherein a memory device context creation command is issued for the additional drawing so that the OS is not notified of the additional drawing as a print page.

17. A non-transitory computer-readable storage medium storing a program for causing a computer to execute the control method according to claim 1.

* * * * *